US012230785B2

(12) United States Patent
Matsumoto et al.

(10) Patent No.: US 12,230,785 B2
(45) Date of Patent: Feb. 18, 2025

(54) MAGNESIUM-CONTAINING ELECTRODE, METHOD FOR FABRICATING THE SAME, AND ELECTROCHEMICAL DEVICE

(71) Applicant: MURATA MANUFACTURING CO., LTD., Kyoto (JP)

(72) Inventors: Ryuhei Matsumoto, Kyoto (JP); Yuri Nakayama, Kyoto (JP); Hideki Kawasaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 585 days.

(21) Appl. No.: 17/505,261

(22) Filed: Oct. 19, 2021

(65) Prior Publication Data

US 2022/0037641 A1 Feb. 3, 2022

Related U.S. Application Data

(63) Continuation of application No. PCT/JP2020/016230, filed on Apr. 7, 2020.

(30) Foreign Application Priority Data

Apr. 19, 2019 (JP) ................. 2019-080283

(51) Int. Cl.
| | |
|---|---|
| *H01M 4/134* | (2010.01) |
| *C25D 3/42* | (2006.01) |
| *H01G 11/30* | (2013.01) |
| *H01G 11/86* | (2013.01) |
| *H01M 4/02* | (2006.01) |

(Continued)

(52) U.S. Cl.
CPC .............. *H01M 4/134* (2013.01); *C25D 3/42* (2013.01); *H01G 11/30* (2013.01); *H01G 11/86* (2013.01); *H01M 4/0452* (2013.01); *H01M 4/1395* (2013.01); *H01M 10/054* (2013.01); *H01M 2004/027* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2016/0020485 A1* | 1/2016 | Liao | ............... | H01M 4/5815 |
| | | | | 429/339 |
| 2017/0275311 A1* | 9/2017 | Kotou | ............... | C07F 9/4084 |
| 2019/0020058 A1 | 1/2019 | Liu | | |

FOREIGN PATENT DOCUMENTS

EP  3 319 164  5/2018

OTHER PUBLICATIONS

Japanese Office Action issued Jul. 26, 2022 in corresponding Japanese Application No. 2021-514930.
(Continued)

*Primary Examiner* — Scott J. Chmielecki
(74) *Attorney, Agent, or Firm* — K&L Gates LLP

(57) ABSTRACT

Provided is a method for fabricating a magnesium-containing electrode by a plating method. In the fabrication process disclosure, a plating solution used in the plating method includes a solvent containing an ether. The solvent includes a first magnesium salt having a disilazide structure represented by a formula $(R_3Si)_2N$ and a second magnesium salt that does not have a disilazide structure. In the formula, R represents a hydrocarbon group having 1 or more and 10 or less carbon atoms.

16 Claims, 13 Drawing Sheets

(51) Int. Cl.
  *H01M 4/04*    (2006.01)
  *H01M 4/1395*  (2010.01)
  *H01M 10/054*  (2010.01)

(56) References Cited

OTHER PUBLICATIONS

Merrill, et al., The Influence of Interfacial Chemistry on Magnesium Electrodeposition in Non-nucleophilic Electrolytes Using Sulfone-Ester Mixtures, Frontiers in Chemistry.
Chinese Office Action issued Jul. 1, 2023 in corresponding Chinese Application No. 202080022414.8.
European Office Action issued Aug. 2, 2023 in corresponding European Application No. 20791115.7.
Liao, et al., The unexpected discovery of the Mg(HMDS)2/ MgCl2 complex as a magnesioum electrolyte for rechareable magnesium batteries, J. Mater. Chem. A, 2015, 3, 6082.

* cited by examiner

MAGNESIUM-CONTAINING ELECTRODE, METHOD FOR FABRICATING THE SAME, AND ELECTROCHEMICAL DEVICE

CROSS REFERENCE TO RELATED APPLICATIONS

The present application is a continuation of PCT patent application no. PCT/JP2020/016230, filed on Apr. 7, 2020, which claims priority to Japanese patent application no. JP2019-080283 filed on Apr. 19, 2019, the entire contents of which are being incorporated herein by reference.

BACKGROUND

The present disclosure relates to a magnesium-containing electrode, a method for fabricating the same, and an electrochemical device.

As electrochemical devices, there are capacitors, air batteries, fuel cells, secondary batteries and the like, and these are used for various purposes. Such electrochemical devices are useful since they can extract electric energy to the outside.

For example, with regard to the electrodes of electrochemical devices represented by magnesium batteries, electrodes containing magnesium are provided as negative electrodes (hereinafter, such electrodes are also simply referred to as "magnesium electrodes", and electrochemical devices fabricated using magnesium electrodes are also referred to as "magnesium electrode-based electrochemical devices"). Magnesium is a more abundant resource and far more inexpensive than lithium. Magnesium is highly safe when used in electrochemical devices, and the quantity of electricity that can be extracted from a unit volume of magnesium by redox reactions is generally large. Hence, magnesium batteries are attracting attention as next-generation secondary batteries to replace lithium-ion batteries.

SUMMARY

The present disclosure relates to a magnesium-containing electrode, a method for fabricating the same, and an electrochemical device.

The negative electrode assumed when a magnesium battery is put into practical use has a thickness in the order of microns (for example, about 20 μm) and is in the form of a "foil". However, magnesium is not suitable for being obtained in the form of a foil by rolling as aluminum, gold, and the like. This is because metal foils such as aluminum and gold are easily fabricated by rolling but magnesium needs to be repeatedly rolled several times because of its metallic properties such as plasticity. In other words, a magnesium foil fabricated to have a thickness in the order of microns by rolling is extremely expensive and is practically not useful.

Plating is conceivable as one means to fabricate magnesium foil. However, it cannot be said that investigation on the practical fabrication of magnesium foil as an electrode for electrochemical devices such as magnesium batteries by plating has been sufficiently conducted.

The present disclosure has been made in view of such problems. In other words, an object of the present disclosure is to provide a plating technique that contributes to the more practical fabrication of an electrode used in an electrochemical device.

The present disclosure discloses attempts to solve the above problems by dealing with the problems in a new direction instead of dealing with the problems as an extension of the prior art. As a result, the disclosure of an electrode by which the object is achieved has been completed.

According to an embodiment of the present disclosure, a method for fabricating a magnesium-containing electrode for an electrochemical device is provided.

The method includes fabricating the magnesium-containing electrode by a plating method, and in which a plating solution used in the plating method includes a solvent containing an ether, and the solvent includes a first magnesium salt having a disilazide structure represented by a formula $(R_3Si)_2N$ (in the formula, R represents a hydrocarbon group having 1 or more and 10 or less carbon atoms) and a second magnesium salt that does not have a disilazide structure.

In the present disclosure, a "magnesium-containing electrode" that is used in an electrochemical device can be obtained in a more practical manner.

More specifically, in the present disclosure, a metal foil in which magnesium is more "densely" packed can be obtained by plating. In other words, a magnesium electrode having a higher magnesium packing density can be obtained by a plating treatment.

The effects described in the present specification are merely exemplary and are not limited, and there may be additional effects.

BRIEF DESCRIPTION OF THE FIGURES

FIGS. 11A and 10B are SEM images of precipitated Mg observed in Comparative Example 1 in [Examples] of the present disclosure (FIG. 11A: magnification of 50,000-fold, FIG. 11B: magnification of 10,000-fold).

DETAILED DESCRIPTION

Figure 1:
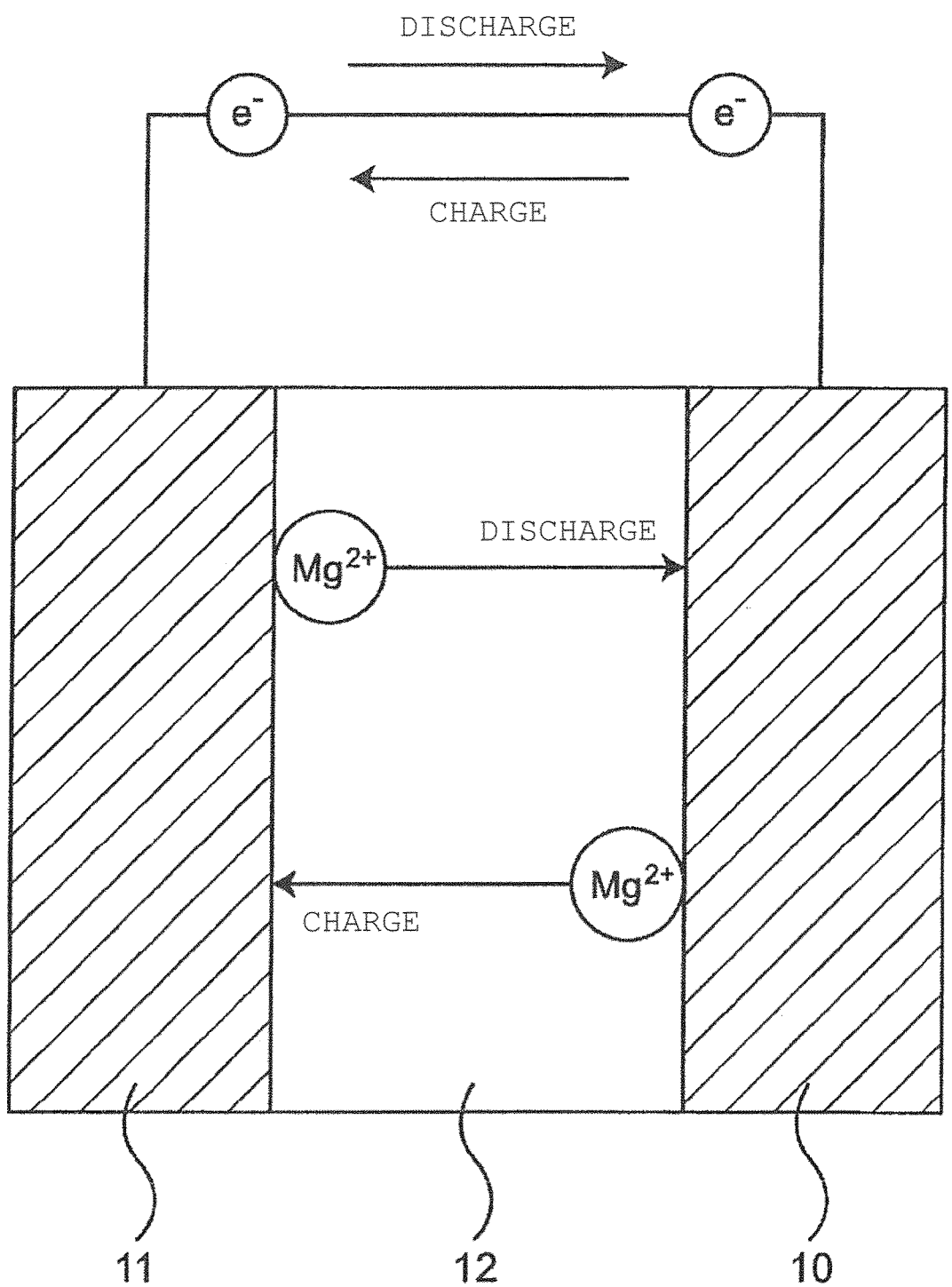
FIG. 1 is a conceptual diagram of a magnesium electrode-based electrochemical device (particularly a battery) according to an embodiment of the present disclosure.

Hereinafter, the "method for fabricating a magnesium-containing electrode for an electrochemical device", "magnesium-containing electrode", and "electrochemical device" of the present disclosure will be described in detail. Although the description will be given with reference to the drawings if necessary, the contents illustrated are merely schematic and exemplary for the purpose of understanding the present disclosure, and the appearance, dimensional ratio, and the like may differ from the actual ones.

In the present disclosure, the "electrochemical device" means a device capable of extracting energy by utilizing an electrochemical reaction in a broad sense and means a device that includes a pair of electrodes and an electrolyte and is particularly charged and discharged with the migration of ions in a narrow sense. Although it is merely an example, examples of the electrochemical device include a capacitor, an air battery, and a fuel cell in addition to a secondary battery.

The present disclosure is a method for fabricating a magnesium-containing electrode for an electrochemical device. In other words, the electrode fabricated in the present disclosure is an electrode used in a device capable of extracting energy by utilizing an electrochemical reaction.

As will also be described later, it is preferable that the negative electrode of an electrochemical device is a magnesium-containing electrode while the positive electrode thereof is a sulfur electrode. In other words, in a certain suitable aspect, the electrode fabricated by the present disclosure is an electrode (negative electrode) for a magnesium (Mg)-sulfur (S) battery.

Here, the term "magnesium-containing electrode" as used in the present specification refers to an electrode containing magnesium (Mg) as an active ingredient (namely, an active material). In other words, a magnesium-containing electrode refers to, for example, an electrode containing magnesium metal or a magnesium alloy, particularly a negative electrode containing magnesium metal or a magnesium alloy. As described above, the "magnesium-containing electrode" is also simply referred to as a magnesium electrode in the present specification. This magnesium electrode may contain components other than magnesium metal or a magnesium alloy but is an electrode having a metal foil of magnesium (for example, an electrode having a magnesium metal foil having a purity of 90% or more, preferably 95% or more, still more preferably 98% or more) in a certain suitable aspect.

In the fabrication method of the present disclosure, a magnesium-containing electrode is fabricated by a plating method. In particular, the plating method performed in the present disclosure is a wet plating method, and a plating solution is used. In other words, a magnesium electrode is fabricated using a plating solution and utilizing an oxidation/reduction reaction in the plating solution.

The plating solution used in the fabrication method of the present disclosure contains at least a solvent and a magnesium salt. More specifically, the plating solution contains a magnesium salt and an ether-based solvent for dissolving the salt.

As the ether-based solvent, ethers such as a cyclic ether such as tetrahydrofuran and a linear ether of which the molecule has a linear structure are conceivable.

In a certain suitable aspect, the solvent is a linear ether, and the magnesium salt is dissolved in the linear ether. In short, the solvent of the plating solution used in the fabrication method of the present disclosure is preferably a linear ether solvent.

The linear ether used as the solvent of the plating solution is preferably an ether represented by the following general formula.

[Chem. 1]

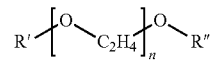

where R' and R" are each independently a hydrocarbon group having 1 or more and 10 or less carbon atoms and n is an integer of 1 or more and 10 or less.

As can be seen from the general formula, the solvent of the plating solution used in the fabrication method of the present disclosure is preferably a linear ether having one or more ethyleneoxy structural units. The term "ethyleneoxy structural unit" as used herein refers to a molecular structural unit (—O—$C_2H_4$—) in which an ethylene group and an oxygen atom are bonded to each other, and one or more such molecular structural units are contained in the solvent of the plating solution.

R' and R" in the general formula of linear ethers each independently represent a hydrocarbon group. Hence, R' and R" may be each independently an aliphatic hydrocarbon group, an aromatic hydrocarbon group, and/or an aromatic aliphatic hydrocarbon group. Here, the "linear ether" as used in the present disclosure means that at least the site of the ethyleneoxy structural unit is not branched (that is, does not have a branched structure). Hence, R' and R" in the general formula are not necessarily a linear structure and may have a branched structure. In a certain suitable aspect, the linear ether used in the plating solution according to the present disclosure is a glycol-based ether in which not only the site of the ethyleneoxy structural unit does not have a branched structure but also R' and R" do not have a branched structure.

In a certain suitable aspect of the linear ether in the present disclosure, a hydrocarbon group having 1 or more and 10 or less carbon atoms is an aliphatic hydrocarbon group. In other words, with regard to the linear ether contained in the plating solution according to the present disclosure, R' and R" in the general formula may be each independently an aliphatic hydrocarbon group of Carbon number of 1 or more and 10 or less. Although not particularly limited, with regard to ethylene glycol-based ethers, examples of linear ethers having an aliphatic hydrocarbon group having 1 or more and 8 or less carbon atoms as each of R' and R" include the following.

Ethylene glycol dimethyl ether, ethylene glycol ethyl methyl ether, ethylene glycol methyl propyl ether, ethylene glycol butyl methyl ether, ethylene glycol methyl pentyl ether, ethylene glycol methyl hexyl ether, ethylene glycol methyl heptyl ether, and ethylene glycol methyl octyl ether;

ethylene glycol diethyl ether, ethylene glycol ethyl propyl ether, ethylene glycol butyl ethyl ether, ethylene glycol ethyl pentyl ether, ethylene glycol ethyl hexyl ether, ethylene glycol ethyl heptyl ether, and ethylene glycol ethyl octyl ether;

ethylene glycol dipropyl ether, ethylene glycol butyl propyl ether, ethylene glycol propyl pentyl ether, ethylene glycol propyl hexyl ether, ethylene glycol propyl heptyl ether, and ethylene glycol propyl octyl ether;

ethylene glycol dibutyl ether, ethylene glycol butyl pentyl ether, ethylene glycol butyl hexyl ether, ethylene glycol butyl heptyl ether, and ethylene glycol butyl octyl ether;

ethylene glycol dipentyl ether, ethylene glycol hexyl pentyl ether, ethylene glycol heptyl pentyl ether, and ethylene glycol octyl pentyl ether;

ethylene glycol dihexyl ether, ethylene glycol heptyl hexyl ether, and ethylene glycol hexyl octyl ether;

ethylene glycol diheptyl ether, and ethylene glycol heptyl octyl ether; and ethylene glycol dioctyl ether The ethyleneoxy structural unit of the linear ether solvent may be two or more, and for example, the linear ether solvent has two to four ethyleneoxy structural units. In other words, in the general formula representing linear ethers, n may be an integer of 2 or more and 4 or less, and the linear ether may be an ether having 2 or more and 4 or less ethyleneoxy structural units. In a certain suitable aspect, the linear ether solvent combined with the first and second magnesium salts is at least one kind selected from the group consisting of diethylene glycol-based ethers, triethylene glycol-based ethers, and tetraethylene glycol-based ethers. A linear ether in which n in the general formula is larger than 4 is also conceivable, and thus the linear ether solvent may be pentaethylene glycol dimethyl ether, hexaethylene glycol dimethyl ether, a heptaethylene glycol-based ether, an octaethylene glycol-based ether, a nonaethylene glycol-based ether, a decaethylene glycol-based ether and the like, and may be a polyethylene glycol-based ether having more ethyleneoxy structural units than these.

In the plating solution used in the fabrication method of the present disclosure, an ether as described above coexists with the magnesium salts. In particular, in the present disclosure, the ether solvent contains a first magnesium salt having a disilazide structure represented by general formula $(R_3Si)_2N$ (in the formula, R is a hydrocarbon group having 1 or more and 10 or less carbon atoms, Si is silicon atom, N is nitrogen atom) and a second magnesium salt that does not have a disilazide structure. In other words, it is not that magnesium salts are simply contained in an ether, but such magnesium salts are two kinds that are peculiar from the viewpoint of "disilazide".

The first magnesium salt corresponding to one metal salt contained in the ether solvent is a metal salt having a disilazide structure (in the formula, R is a hydrocarbon group having 1 or more and 10 or less carbon atoms). On the other hand, the second magnesium salt, which is the other metal salt contained in the ether solvent, is a metal salt that does not have such a disilazide structure. By containing at least two kinds of magnesium salts, one having a "disilazide structure" and the other not having a "disilazide structure", in an ether in this way, an electrode having a higher magnesium packing density as a magnesium-containing electrode can be obtained by a plating method. In other words, in the present disclosure, a metal foil in which magnesium is more "densely" packed can be obtained by plating but not by rolling. Hence, a magnesium electrode having a higher magnesium packing density, namely, a magnesium electrode having a higher Mg density can be obtained by a plating treatment. This preferably means that an electrode having a higher energy density can be obtained as a negative electrode of a magnesium electrode-based electrochemical device, and may contribute to the miniaturization of the electrochemical device. Assuming a secondary battery as an electrochemical device, in a plating solution containing an ether solvent in which the above-mentioned first magnesium salt and second magnesium salt are dissolved, a magnesium electrode having a higher energy density can be obtained, and it can be said that a further miniaturized magnesium secondary battery is realized.

The second magnesium salt itself, which is a metal salt not having a disilazide structure, may be a salt represented by general formula $MgX_n$ (where n is 1 or 2, and X is a monovalent or divalent anion). When X is a halogen (F, Cl, Br, or I), such a magnesium salt forms a metal halide salt. X may be another anion, and the second magnesium salt may be, for example, at least one magnesium salt selected from the group consisting of magnesium perchlorate $(Mg(ClO_4)_2)$, magnesium nitrate $(Mg(NO_3)_2)$, magnesium sulfate $(MgSO_4)$, magnesium acetate $(Mg(CH_3COO)_2)$, magnesium trifluoroacetate $(Mg(CF_3COO)_2)$, magnesium tetrafluoroborate $(Mg(BF_4)_2)$, magnesium tetraphenylborate $(Mg(B(C_6H_5)_4)_2)$, magnesium hexafluorophosphate $(Mg(PF_6)_2)$, magnesium hexafluoroarsenate $(Mg(AsF_6)_2)$, a magnesium salt of perfluoroalkyl sulfonic acid $((Mg(R_{f1}SO_3)_2)$, where $R_{f1}$ is a perfluoroalkyl group), and a magnesium salt of perfluoroalkylsulfonylimide $(Mg((R_{f2}SO_2)_2N)_2$, where $R_{f2}$ is a perfluoroalkyl group).

In the present disclosure, it is preferable that the second magnesium salt is not one kind but includes at least two kinds. In other words, it is preferable that the magnesium salt to be combined with "the first magnesium salt having a disilazide structure" includes two or more kinds of magnesium salts. In a certain suitable aspect of the plating solution, the linear ether solvent has ethyleneoxy structural units, and there are at least two kinds of second magnesium salts of "non-disilazide" dissolved in this solvent together with the first magnesium salt of "disilazide". This makes it easier to obtain a magnesium electrode having a higher energy density by a plating method, and to realize a further miniaturized electrochemical device.

The two kinds of second magnesium salts are preferably a halogen-based magnesium salt and an imide-based magnesium salt. In other words, when the second magnesium salt combined with the "first magnesium salt having a disilazide structure" includes at least two kinds, it is preferable that these two kinds are a metal halide salt and a metal imide salt. This means that in the plating solution used in the fabrication method of the present disclosure, an ether solvent, for example, the above-described linear ether is preferably in a state in which "the first magnesium salt having a disilazide structure" is dissolved as well as a state in which a metal halide salt and a metal imide salt are dissolved.

Examples of the metal halide salt include at least one kind selected from the group consisting of magnesium fluoride $(MgF_2)$, magnesium chloride $(MgCl_2)$, magnesium bromide $(MgBr_2)$, and magnesium iodide $(MgI_2)$. Among these, magnesium chloride is preferably used as a metal halide salt. In other words, it is preferable that one of at least two kinds of metal salts combined with the first magnesium salt of "disilazide" in an ether solvent, for example, the above-described linear ether, is magnesium chloride $(MgCl_2)$. This is because the metal halide salt is coupled with an imide salt and it is easier to obtain a magnesium electrode having a higher energy density and to realize a further miniaturized electrochemical device.

The metal imide salt is a magnesium salt having an imide as a molecular structure. Preferably, the metal imide salt is a magnesium salt having a sulfonylimide as its molecular structure. This is because the metal imide salt is coupled with the metal halide salt (for example, magnesium chloride) and it is easier to obtain a magnesium electrode having a higher energy density and to realize a further miniaturized electrochemical device.

In a certain suitable aspect, the metal imide salt is magnesium salt of perfluoroalkylsulfonylimide. In other words, it is preferable that the metal imide salt is $Mg((R_fSO_2)_2N)_2$ (in the formula, $R_f$: perfluoroalkyl group). For example, $R_f$ may be a perfluoroalkyl group having 1 or more and 10 or less carbon atoms, a perfluoroalkyl group having 1 or more and 8 or less carbon atoms, a perfluoroalkyl group having 1 or more and 6 or less carbon atoms, a perfluoroalkyl group having 1 or more and 4 or less carbon atoms, a perfluoroalkyl group having 1 or more and 3 or less carbon atoms, or a perfluoroalkyl group having 1 to 2 carbon atoms. Although it is an example, the metal imide salt is magnesium bis(trifluoromethanesulfonyl)imide, namely, $Mg(TFSI)_2$. This is because $Mg(TFSI)_2$ is coupled with the metal halide salt (particularly magnesium chloride ($MgCl_2$)) and it is easier to obtain a magnesium electrode having a higher energy density and to realize a further miniaturized electrochemical device.

The first magnesium salt corresponding to one metal salt contained in the ether solvent is a metal salt having a disilazide structure. Hydrocarbon groups in the disilazide structure may be an aliphatic hydrocarbon group, an aromatic hydrocarbon group, and/or an aromatic aliphatic hydrocarbon group. In other words, in the first magnesium salt having a disilazide structure represented by general formula $(R_3Si)_2N$, R is a hydrocarbon having 1 or more and 10 or less carbon atoms, and may be an aliphatic hydrocarbon group, an aromatic hydrocarbon group, and/or an aromatic aliphatic hydrocarbon group having such a number of carbon atoms.

In a certain suitable aspect, R in the disilazide structure of the first magnesium salt is an aliphatic hydrocarbon group having 1 or more and 10 or less carbon atoms. This aliphatic hydrocarbon group may be a saturated hydrocarbon or an unsaturated hydrocarbon.

For example, the aliphatic hydrocarbon group may be an alkyl group. In this case, in view of the disilazide structure of $(R_3Si)_2N$, it can be said that the first magnesium salt in the present disclosure preferably has a trialkylsilyl group. As such a first magnesium salt is combined with a metal halide salt and a metal imide salt as described above, it is easier to obtain a magnesium electrode having a higher energy density and to realize a further miniaturized electrochemical device.

In a certain suitable aspect, the hydrocarbon group in the disilazide structure of the first magnesium salt is a lower alkyl group, and is thus, for example, a lower alkyl group having 1 or more and 4 or less carbon atoms. In other words, in the first magnesium salt having a disilazide structure represented by general formula $(R_3Si)_2N$, R is a hydrocarbon group and may be particularly an alkyl group having 1 or more and 4 or less carbon atoms. Taking the case where the hydrocarbon group of R is a saturated hydrocarbon group as an example, R in the first magnesium salt having a disilazide structure represented by $(R_3Si)_2N$ may be a methyl group, an ethyl group, an n-propyl group, an isopropyl group, a sec-butyl group, a tert-butyl group and/or the like.

A suitable form of the first magnesium salt is one having a methyl group. For example, the first magnesium salt used in the plating solution used in the fabrication method of the present disclosure is magnesium bis(hexamethyldisilazide), namely, $Mg(HMDS)_2$. By using this first magnesium salt, it is easy to obtain a magnesium electrode having a higher energy density. In particular, as such magnesium bis(hexamethyldisilazide) is combined with a metal halide salt and a metal imide salt, it is easier to obtain a magnesium electrode having a higher energy density and to realize a further miniaturized electrochemical device.

In a certain suitable aspect, the amount of the first magnesium salt (particularly the amount of substance) contained in the ether solvent is smaller than that of the second magnesium salt. The molar ratio of the first magnesium salt to the second magnesium salt is 0.01 or more. The molar ratio of "first magnesium salt to second magnesium salt" as used herein refers to a value corresponding to "$N_{first\ Mg\ salt}/N_{second\ Mg\ salt}$", where "$N_{first\ Mg\ salt}$" denotes the amount of substance of the first magnesium salt and "$N_{second\ Mg\ salt}$" denotes the amount of substance of the second magnesium salt. When the second magnesium salt includes at least two kinds of salts, the sum of the amounts of substances for the respective salts corresponds to "the amount of substance of the second magnesium salt". In a plating solution according to such a suitable aspect, the amount of substance of the first magnesium salt contained in the ether solvent is less than the amount of substance of the second magnesium salt. In other words, in the plating solution used in the fabrication method of the present disclosure, the content of the first magnesium salt having a disilazide structure represented by $(R_3Si)_2N$ is not large and may be at most less than or equal to the amount of substance of the other magnesium salt (namely, the second magnesium salt) (for example, half or less the amount of substance of the other magnesium salt). Even when the first magnesium salt is contained in such a content, it is possible to obtain a magnesium electrode having a higher energy density and to realize a further miniaturized magnesium secondary battery.

In a more peculiar aspect, in the plating solution used in the fabrication method of the present disclosure, the molar ratio of the first magnesium salt to the second magnesium salt may be in a range of 0.05 or more and less than 1, for example, in a range of 0.05 or more and 0.6 or less, in a range of 0.05 or more and 0.3 or less, or in a range of 0.1 or more and 0.2 or less. As described above, in the plating solution according to the present disclosure, the first magnesium salt may be contained in the linear ether solvent in a small amount/significantly small amount, and a magnesium electrode having a higher energy density can be obtained when the first magnesium salt is contained in such an amount as well.

When a metal imide salt is contained as the second magnesium salt, the ether solvent may contain the first magnesium salt in an amount less than or equal to the amount of substance of this metal imide salt. This is true particularly when the second magnesium salt includes at least two kinds of a metal imide salt and a metal halide salt. In other words, when the second magnesium salt of "non-disilazide" to be combined with the first magnesium salt of "disilazide" is a metal imide salt and a metal halide salt, the molar ratio of the first magnesium salt to the metal imide salt may be 0.05 or more and less than 1 (for example, 0.3 or more and 0.7 or less, or 0.4 or more and 0.6 or less). In this way, when the amount of the first magnesium salt of "disilazide" to be combined with a metal imide salt is smaller than that of the metal imide salt as well, a magnesium electrode having a higher energy density can be obtained.

In the plating solution used in the fabrication method of the present disclosure, the linear ether preferably used as a solvent of the first magnesium salt and the second magnesium salt may be an ether having a single ethyleneoxy structural unit. In other words, n in [Chem. 1] may be 1, and thus the linear ether may be an ethylene glycol-based ether. In this linear ether, R' and R" in [Chem. 1] may have the same alkyl group as each other. Examples of the linear ether include ethylene glycol dimethyl ether and/or ethylene glycol diethyl ether. In the case of such a linear ether, the secondary magnesium salt may include, for example, a metal halide salt and a metal imide salt, the metal halide salt may be magnesium chloride, and the imide salt may be a magnesium salt of perfluoroalkylsulfonylimide (for example, $Mg(TFSI)_2$).

In the plating solution used in the fabrication method of the present disclosure, magnesium precipitated as the plating treatment proceeds may have a peculiar form. In particular, the magnesium has a form that contributes to a higher magnesium packing density. Specifically, in the fabrication method of the present disclosure, preferably a granular precipitate is obtained as a plated precipitate of magnesium.

In the present disclosure, magnesium is precipitated from the above-described plating solution and the plating film grows as the oxidation/reduction reaction of plating proceeds, but the magnesium precipitate (or crystals thereof) does not have a bulky shape such as an elongated shape or a needle shape. In other words, in the case of magnesium precipitate (or crystals thereof) having a bulky shape such as an elongated shape or a needle shape, the grown plating film may be "sparse" and the finally obtained plating film hardly has a high packing density. On the other hand, in the case of granular magnesium precipitate (or crystals thereof) as in the present disclosure, the grown plating film may be "dense" and the finally obtained plating film is likely to have a higher packing density. In the present disclosure, it can be said that the Mg plated precipitate or crystals of the Mg plated precipitate are likely to be used for closet packing of the plating film.

In a broad sense, the term "granular precipitate" as used in the present disclosure does not mean a bulky shape such as an elongated shape or a needle shape but means a precipitate having a shape which may allow a "grain" to be formed and the grown plating film to be relatively "dense" as recognized by those skilled in the art of plating. In a narrow sense, it can be said that the term "granular" as used in the present disclosure means not to have a plan-view shape that leads to the growth of a "sparse" plating film but to have, for example, a plan-view shape that does not have shape specificity that is extremely large only in a certain direction. The "plan-view shape" may be, for example, the shape of the magnesium precipitate in a SEM image.

More specifically, the "granular precipitate" refers to a magnesium precipitate having an aspect ratio of 0.8 to 1.2 (more preferably 0.9 to 1.1) in plan view. The "aspect ratio" as used herein means the ratio (Lb/La) of the other dimension (Lb) to an arbitrary one dimension (La) of two dimensions orthogonal to each other in the plan-view shape of magnesium precipitate (for example, the arithmetic mean for arbitrary five dimensional ratios). When a plurality of granular precipitates may be present in plan view of a SEM image or the like, the "aspect ratio" means the arithmetic mean of arbitrary five.

Figure 9A:
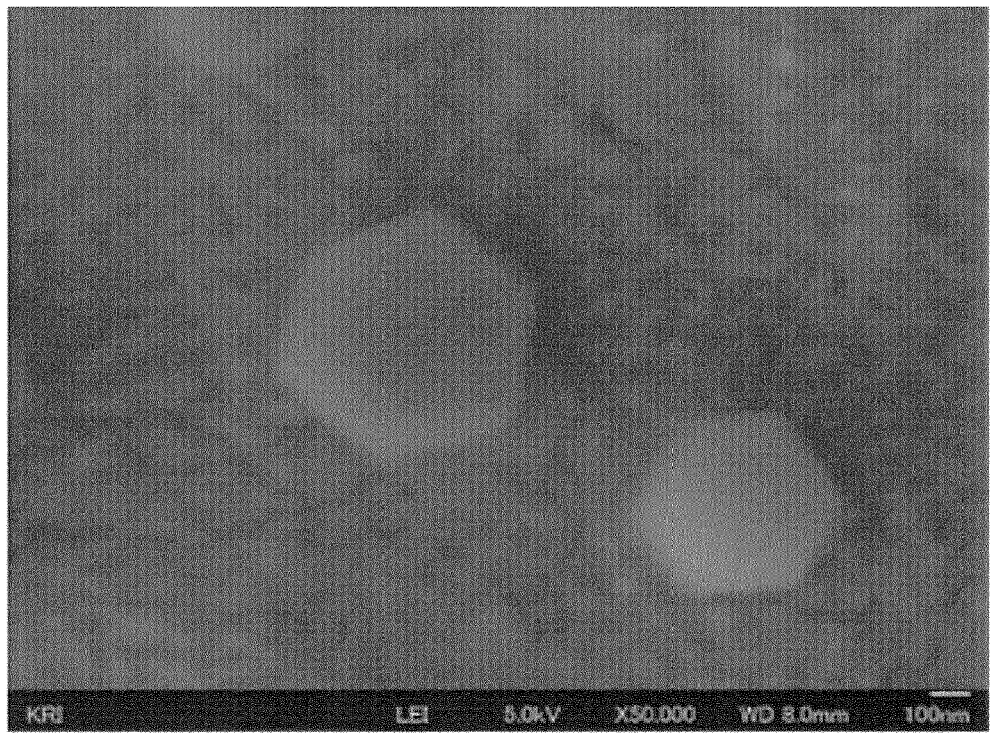
FIGS. 9A and 9B are SEM images of precipitated Mg observed in Example 1 in [Examples] of the present disclosure (FIG. 9A: magnification of 50,000-fold, FIG. 9B: magnification of 10,000-fold).
Figure 9B:
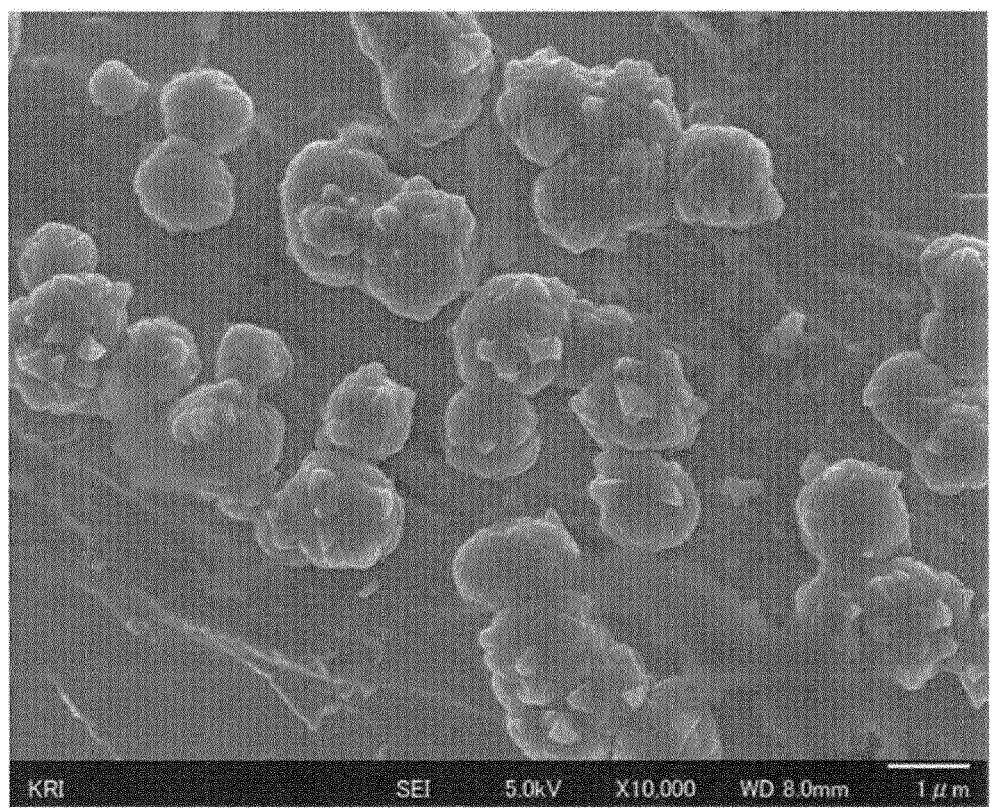

In a certain suitable aspect, the magnesium precipitate has a geometric grain shape. In other words, the granular precipitate has a geometric shape. For example, the magnesium precipitate has a form as illustrated in FIGS. 9 and 10 (particularly FIG. 9(a)) referred to in Examples described later. The term "geometric shape" as used in the present specification means that the shape of precipitated magnesium is regulative or regular in a broad sense, and means that the plan-view shape of precipitated magnesium (particularly the shape in the SEM image) is regulative or regular in a narrow sense. A "geometric" shape is, for example, a polygonal shape exhibiting symmetric property, such as a triangle, a quadrangle, or a hexagon. In a certain suitable aspect, as illustrated in FIG. 9(a), the precipitated magnesium forms a grain having a substantially regular hexagonal shape. In this grain having a substantially regular hexagonal shape, the precipitated magnesium is likely to grow so as to be "densely" packed (particularly, grow so as to be packed in the plane direction), and thus an electrode having a higher magnesium packing density can be obtained as a magnesium-containing electrode. This means that it is easy to obtain a negative electrode having a higher energy density, and this may contribute to the miniaturization of an electrochemical device.

In the fabrication method of the present disclosure, a magnesium-containing electrode is fabricated by performing a plating treatment, and the plating may be electroplating or electroless plating. In other words, the wet plating performed in the fabrication method of the present disclosure may be electroplating or electroless plating.

In electroplating, a reduction reaction is caused at the cathode by applying electric energy to two electrodes of a cathode and an anode, which are immersed in a plating solution and electrically connected via an external electrode. In the plating solution, magnesium ions derived from the electrode materials, the first magnesium salt, and/or the second magnesium salt may be present, and thus magnesium is precipitated by the reduction reaction of these ions at the cathode, and a magnesium-containing electrode is obtained. The cathode (working electrode) used for electroplating may be, for example, an electrode containing at least one kind selected from the group consisting of copper, aluminum, and nickel (although it is an example, "copper foil"), and the anode may be, for example, an electrode containing magnesium. When electric energy is applied to such plating electrodes of a cathode and an anode from an external power source, magnesium ions in the plating solution can receive electrons at the cathode interface and precipitate as magnesium.

In such electroplating, wiring, a bus bar, a temperature controller for heating and cooling the plating solution, and the like may be provided in addition to a tank for storing the plating solution (electrolytic tank) and an external power source (rectifier).

On the other hand, electroless plating is a plating method performed without the help of an external power source. In other words, a reduction reaction is caused on a certain material (material to be plated) that is immersed in a plating solution but is not particularly connected to an external power source. Here, in the present disclosure, a reducing agent may not be particularly added to the plating solution. The plating solution used in the fabrication method of the present disclosure contains a first magnesium salt having a disilazide structure represented by general formula $(R_3Si)_2N$ (in the formula, R is a hydrocarbon group having 1 or more and 10 or less carbon atoms) and a second magnesium salt that does not have a disilazide structure in an ether solvent, but may not contain a reducing agent for promoting the reduction reaction of ions in the plating solution as long as it contains at least these. In other words, the electroless plating performed in the present disclosure can be said to be a method of obtaining a magnesium-containing electrode by precipitating magnesium by utilizing the ionization tendency of metals preferably in the absence of the supply of electric energy from the outside and the action of reducing agent. Since the material itself to be immersed in the plating solution contains a metal, and thus in electroless plating according to the present disclosure, it can be said that magnesium having a high potential is precipitated in the plating solution to replace at least a part of a metal having a low potential.

In electroless plating, the material that is immersed in the plating solution as an object to be plated may contain a metal having higher ionization tendency than magnesium, for example, at least one kind selected from the group consisting of lithium, cesium, rubidium, potassium, barium, strontium, calcium, and sodium. A metal having such high ionization tendency may be provided on a proper support (for example, a metal support such as copper). In other words, in electroless plating, a composite metal member including two or more kinds so as to contain a metal having higher ionization tendency than magnesium may be used as the object to be plated.

In electroless plating, a plating equipment as used for the above-described electroplating may be used except for those related to the supply of electric energy from the outside.

In the fabrication method of the present disclosure, plating is performed and thus magnesium precipitates are preferably generated on a metal material. The plating method is particularly wet plating, thus a plating solution is used, and magnesium is precipitated on a metal material immersed in the plating solution. Here, in the plating method according to the present disclosure, magnesium may be precipitated on a metal material to form a magnesium foil on the metal material, and the "magnesium-containing electrode" may be obtained as an electrode including the metal material and the magnesium foil.

In the case of electroplating (for example, electrodeposition plating), an electrode including a metal material used as the negative electrode in this plating process and a magnesium foil that is precipitated and formed on the metal material may be used as the "magnesium-containing electrode". In other words, an electrode including the negative electrode metal material for such a plating treatment and a magnesium thin layer may be used as a magnesium electrode for an electrochemical device.

On the other hand, in the case of electroless plating, an electrode including a material as the object to be plated in this plating process and a magnesium foil that is precipitated and formed on the material may be used as the "magnesium-containing electrode". In other words, an electrode including the metal material subjected to such a plating treatment and a magnesium thin layer may be used as a magnesium electrode for an electrochemical device.

Next, the magnesium-containing electrode of the present disclosure will be described. This electrode is an electrode obtained by the above-described fabrication method. In other words, the electrode of the present disclosure is a magnesium electrode of a plating thin film or a plated foil to be used in an electrochemical device. In short, the electrode of the present disclosure is a magnesium-plated electrode for an electrochemical device.

In electrochemical devices, the electrode of the present disclosure preferably forms a negative electrode. As will also be described later, in such electrochemical devices, the negative electrode may be a magnesium electrode while the positive electrode may be a sulfur electrode or the like. In this regard, the magnesium-containing electrode of the present disclosure, namely, the magnesium-plated electrode, corresponds to the negative electrode of such electrochemical devices.

The magnesium-containing electrode of the present disclosure includes a magnesium-plated thin film or a magnesium-plated foil instead of a rolled magnesium thin film. Particularly preferably, the magnesium-containing electrode according to the present disclosure includes a magnesium foil containing granular magnesium precipitates. In other words, the magnesium electrode is a magnesium foil formed from granular precipitates of magnesium, or at least includes this foil.

Figure 11A:
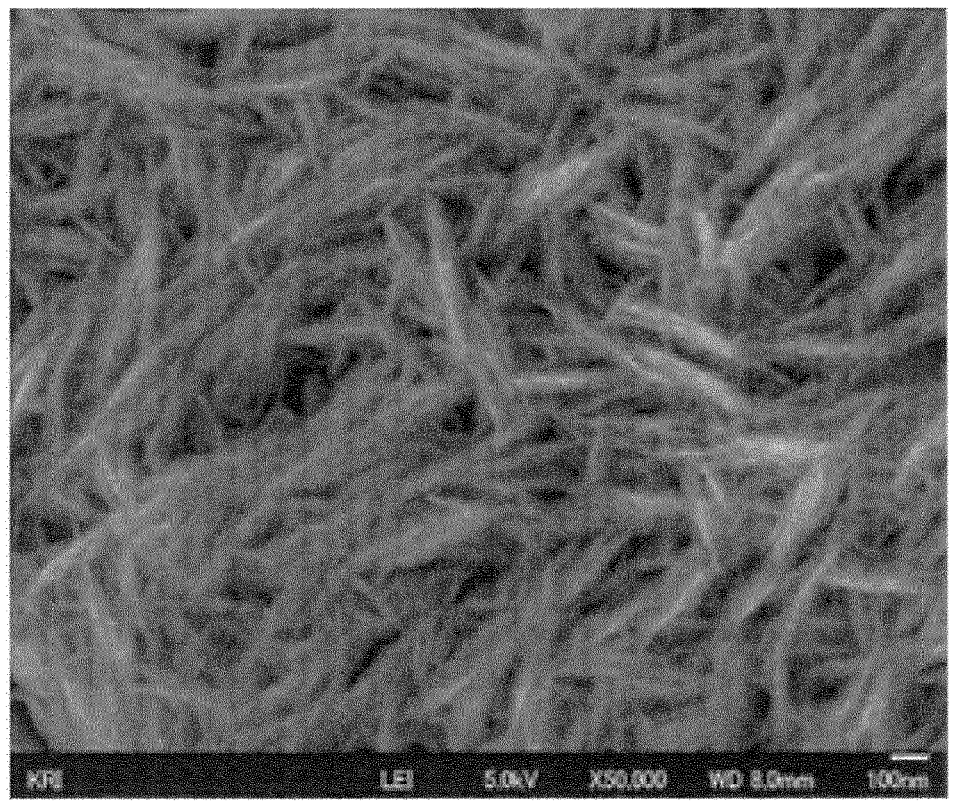
Figure 11B:
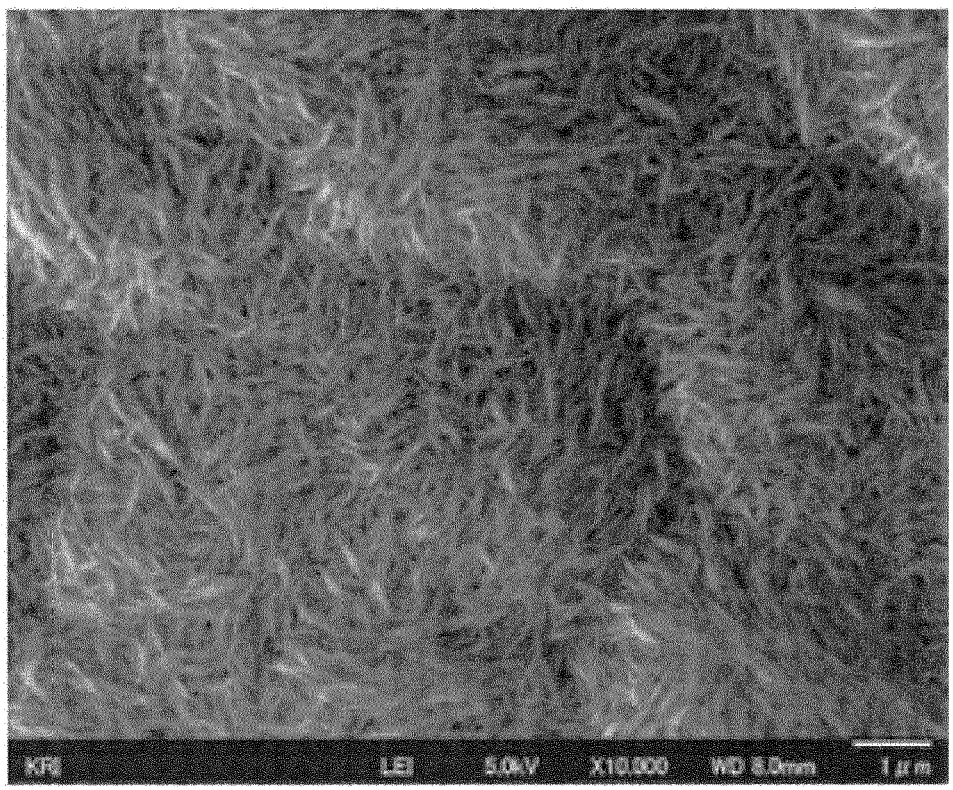

Since the magnesium foil is such a granular magnesium substance, the plating electrode (magnesium-plated electrode) according to the present disclosure preferably has a foil form in which magnesium is packed in a closest packing form or a form close to closest packing. Hence, the electrode of the present disclosure may constitute an electrode having a higher packing density (for example, the electrode may constitute an electrode having a higher packing density than a magnesium substance having an elongated shape/needle shape or the like as illustrated in FIG. 11), thus may serve as an electrode having a higher energy density and contribute to the miniaturization of electrochemical device.

The "granular precipitate of magnesium" as used herein refers to a magnesium precipitate having an aspect ratio of 0.8 to 1.2 (more preferably 0.9 to 1.1) in plan view. The "aspect ratio" means the ratio (Lb/La) of the other dimension (Lb) to an arbitrary one dimension (La) of two dimensions orthogonal to each other in the plan-view shape of magnesium precipitate (for example, the arithmetic mean for arbitrary five dimensional ratios). When a plurality of granular precipitates may be present in plan view of a SEM image or the like, the "aspect ratio" means the arithmetic mean of arbitrary five.

In a certain suitable aspect, the granular magnesium precipitate has a geometric grain shape. For example, the magnesium precipitate may have a form as illustrated in FIGS. 9 and 10 (particularly FIG. 9(a)) referred to in Examples described later. The term "geometric shape" as used in the present specification means that the shape of precipitated magnesium is regulative or regular in a broad sense, and means that the plan-view shape of precipitated magnesium (particularly the shape in the SEM image) is regulative or regular in a narrow sense. A "geometric" shape is a polygonal shape that reflects the symmetric property of a crystal, such as a triangle, a quadrangle, or a hexagon. In short, the plan-view shape of the magnesium precipitate is, for example, a shape exhibiting symmetric property. In a certain suitable aspect, as illustrated in FIG. 9(a), the precipitated magnesium forms a grain having a substantially regular hexagonal shape (namely, a grain having a substantially regular hexagonal shape as a plan-view shape).

In the electrode of the present disclosure, a magnesium foil may be provided on a metal material, and the metal material may serve as an electrode current collecting section. Since the metal material is an electrode current collecting section, the magnesium foil corresponds to the electrode active layer. In this case, since the magnesium foil is a plated foil, the metal material may correspond to the "metal material of the working electrode" (in the case of electroplating) or the "material as the object to be plated" (in the case of electroless plating) used in the fabrication of plated foil. For example, the electrode of the present disclosure may have a configuration in which the metal material is a copper material and a magnesium-plated foil is provided on the copper material. Alternatively, when a metal material including a copper material and a "metal having higher ionization tendency than magnesium" is used in the fabrication of plated foil (particularly fabrication by electroless plating), the electrode of the present disclosure may have a configuration in which a magnesium-plated foil is provided on this metal material (for example, may have a configuration including a copper material and a magnesium foil provided on the copper material, or a configuration including a copper material and the metal having high ionization tendency and a magnesium foil provided on the metal).

In a certain suitable aspect, the magnesium foil is in the order of microns, preferably 10 μm to 30 μm, more preferably 15 μm to 25 μm (for example, about 20 μm). In other words, it can be said that the magnesium-plated thin film in the electrode of the present disclosure has such a thickness and magnesium (Mg) as an active ingredient (namely, an active material) of an electrode in an electrochemical device has such a thickness.

The related matters or more detailed matters of the electrode of the present disclosure are described in the [Method for fabricating magnesium-containing electrode for electrochemical device] above and thus will not be described in order to avoid duplication.

Next, the electrochemical device of the present disclosure will be described. This electrochemical device includes a negative electrode and a positive electrode, and a magnesium electrode is provided as the negative electrode. In this electrochemical device, the negative electrode thereof is the above-described electrode, namely, the "magnesium-containing electrode" obtained by the above-described fabrication method.

In the electrochemical device of the present disclosure, the negative electrode may be the above-described "magnesium-containing electrode" while the positive electrode may be a sulfur electrode. In other words, the positive electrode may be a sulfur electrode containing at least sulfur. In this case, the sulfur electrode of the electrochemical device of the present disclosure is preferably configured as a positive electrode of sulfur (S) such as $S_8$ or polymeric sulfur. Since the negative electrode is a magnesium electrode, the electrochemical device of the present disclosure is an electrochemical device including a magnesium electrode-sulfur electrode pair.

The term "sulfur electrode" as used in the present specification refers to an electrode containing sulfur (S) as an active ingredient (namely, an active material) in a broad sense. The term "sulfur electrode" refers to an electrode that contains at least sulfur in a narrow sense, for example, refers to an electrode containing sulfur (S) such as $S_8$ and/or polymeric sulfur, particularly a positive electrode containing sulfur (S) such as $S_8$ and/or polymeric sulfur. The sulfur electrode may contain components other than sulfur, and may contain, for example, a conductive auxiliary agent and a binder. Although it is merely an example, the sulfur content in the sulfur electrode may be 5% by mass or more and 95% by mass or less, for example, about 70% by mass or more and 90% by mass or less based on the whole electrode.

Examples of the conductive auxiliary agent contained in the sulfur electrode used as a positive electrode include carbon materials such as graphite, carbon fiber, carbon black, and carbon nanotubes, and these can be used singly or in mixture of two or more kinds thereof. As the carbon fiber, for example, vapor growth carbon fiber (VGCF (registered trademark)) and the like can be used. As the carbon black, for example, acetylene black and/or Ketjenblack can be used. As the carbon nanotubes, for example, single-walled carbon nanotubes (SWCNTs) and/or multi-walled carbon nanotubes (MWCNTs) such as double-walled carbon nanotubes (DWCNTs) can be used. Materials other than the carbon materials can be used as long as the materials exhibit favorable conductivity, and for example, a metal material such as Ni powder and/or a conductive polymer material can also be used. Examples of the binder contained in the sulfur electrode used as a positive electrode include polymer resins such as fluorine-based resins such as polyvinylidene fluoride (PVdF) and/or polytetrafluoroethylene (PTFE), polyvinyl alcohol (PVA)-based resins, and/or styrene-butadiene copolymer rubber (SBR)-based resins. A conductive polymer may be used as the binder. As conductive polymers, for example, substituted or unsubstituted polyaniline, polypyrrole, and polythiophene, and (co)polymers produced from one kind or two kinds selected from these can be used.

On the other hand, in the electrochemical device of the present disclosure, the material (specifically, the negative electrode active material) constituting the negative electrode is a "magnesium-containing electrode". Hence, the part containing the active ingredient (namely, the active material) of the negative electrode is a magnesium-plated foil.

In the electrochemical device of the present disclosure, it is preferable that the positive electrode and the negative electrode are separated from each other by an inorganic separator or an organic separator which allows magnesium ions to pass through as well as prevents short circuits due to contact between the two electrodes. Examples of the inorganic separator include a glass filter and glass fiber. Examples of the organic separator include porous membranes formed of synthetic resins such as polytetrafluoroethylene, polypropylene, and polyethylene, and the organic separator can also have a structure in which two or more kinds of these porous membranes are laminated. Among these, a polyolefin porous membrane is preferable since this has an excellent short circuit preventing effect and can improve the safety of the battery by the shutdown effect.

The electrolytic solution of the electrochemical device may contain, for example, a solvent and a magnesium salt dissolved in the solvent. This solvent may be an ether solvent. The magnesium salt may include a metal halide salt and/or a metal imide salt. These ether solvent, metal halide salt, and metal imide salt may be the same as the ether solvent, metal halide salt, and metal imide salt mentioned in the [Method for fabricating magnesium-containing electrode for electrochemical device]. The electrolytic solution may be provided as an electrolyte layer. In this case, the electrolyte layer in the electrochemical device can be formed of an electrolytic solution and a polymer compound containing a retainer that retains the electrolytic solution. The electrolyte layer may be a solid electrolyte layer.

The magnesium electrode-based electrochemical device can be configured as a secondary battery, and a conceptual diagram in that case is illustrated in FIG. 1. As illustrated in FIG. 1, magnesium ions ($Mg^{2+}$) immigrate from a positive electrode 10 to a negative electrode 11 through an electrolyte layer 12 to convert electric energy into chemical energy and store the chemical energy at the time of charge. At the time of discharge, the magnesium ions return from the negative electrode 11 to the positive electrode 10 through the electrolyte layer 12 to generate electric energy.

When the electrochemical device is a battery (primary battery or secondary battery), the battery can be used as a driving power source or an auxiliary power source of, for example, notebook personal computers, PDAs (Personal Digital Assistants), mobile phones, smartphones, cordless phone masters and slaves, video movies, digital still cameras, ebooks, electronic dictionaries, portable music players, radios, headphones, game consoles, navigation systems, memory cards, cardiac pacemakers, hearing aids, power tools, electric shavers, refrigerators, air conditioners, television receivers, stereos, water heaters, microwave ovens, dishwashers, washing machines, dryers, lighting equipment, toys, medical equipment, robots, road conditioners, traffic lights, railroad vehicles, golf carts, electric carts, electric vehicles (including hybrid electric vehicles) and/or the like. The battery can be installed as a power source for electric power storage of buildings including houses or power generation facilities, or can be used to supply electric power to these. In an electric vehicle, a conversion device that converts electric power into driving force by supplying electric power is generally a motor. The control device (control unit) that processes information related to vehicle control includes a control device that displays the remaining battery level based on the information related to the remaining battery level. The battery can also be used in electric power storage devices in so-called smart grids. Such an electric power storage device not only can supply electric power but also can store electric power by receiving supply of electric power from another power source. As this another power source, for example, thermal power generation, nuclear power generation, hydroelectric power generation, solar cells, wind power generation, geothermal power generation, fuel cells (including biofuel cells) and/or the like can be used.

The electrochemical device of the present disclosure (particularly, the secondary battery of the present disclosure) can be applied in a battery pack including a secondary battery, a control means (or a control unit) that controls matters related to the secondary battery, and an exterior accommodating the secondary battery. In this battery pack, the control means controls, for example, charge and discharge, overdischarge, or overcharge of the secondary battery.

The electrochemical device (namely, the secondary battery) of the present disclosure can also be applied to an electronic apparatus that receives supply of electric power from a secondary battery.

The electrochemical device of the present disclosure (particularly, the secondary battery of the present disclosure) can also be applied to an electrically driven vehicle having a conversion device that receives supply of electric power from a secondary battery and converts the electric power into vehicle driving force and a control device (or a control unit) that processes information related to vehicle control based on the information related to the secondary battery. In this electrically driven vehicle, the conversion device typically receives supply of electric power from a secondary battery to drive the motor and generate driving force. Regenerative energy can also be utilized to drive the motor. The control device (or control unit) processes information related to vehicle control based on, for example, the remaining battery level of the secondary battery. Such an electrically driven vehicle includes, for example, so-called hybrid electric vehicles in addition to electric vehicles, electric motorcycles, electric bicycles, railroad vehicles and the like.

The electrochemical device of the present disclosure can be applied to a secondary battery in an electric power system configured to receive supply of electric power from a secondary battery and/or supply electric power from a power source to a secondary battery. Such an electric power system may be any electric power system as long as it approximately uses electric power, and also includes a simple electric power device. This electric power system includes, for example, smart grids, household energy management systems (HEMS), and/or vehicles, and can also store electric power.

The electrochemical device of the present disclosure (particularly, the secondary battery of the present disclosure) can be applied to a power source for electric power storage configured to include a secondary battery and be connected to an electronic apparatus to which electric power is supplied. The electrochemical device of the present disclosure can also be used for basically any electric power system or electric power device regardless of the use of the power source for electric power storage, and can be used for, for example, a smart grid.

Here, the case where the magnesium electrode-based electrochemical device of the present disclosure is used as a secondary battery will be described in more detail. Hereinafter, this secondary battery is also referred to as a "magnesium secondary battery".

The magnesium secondary battery as the electrochemical device of the present disclosure can be applied to machines, apparatuses, appliances, devices, and systems (assemblies of a plurality of apparatuses and the like) which can utilize the magnesium secondary battery as a driving/operating power source or an electric power storage source for electric power accumulation without particular limitation. The magnesium secondary battery (for example, a magnesium-sulfur secondary battery) used as a power source may be a main power source (a power source used preferentially) or an auxiliary power source (a power source used in place of or switched from the main power source). When the magnesium secondary battery is used as an auxiliary power source, the main power source is not limited to the magnesium secondary battery.

Specific examples of uses of the magnesium secondary battery (for example, a magnesium-sulfur secondary battery) include the driving of various electronic apparatuses and electrical apparatuses (including portable electronic apparatuses) such as video cameras and camcorders, digital still cameras, mobile phones, personal computers, television receivers, various display devices, cordless phones, headphone stereos, music players, portable radios, ebooks, electronic paper such as electronic newspapers, and/or mobile information terminals including PDAs; toys; portable living appliances such as electric shavers; lighting fixtures such as interior lights; medical electronic apparatuses such as pacemakers and/or hearing aids; memory devices such as memory cards; battery packs used in personal computers and the like as removable power sources; power tools such as power drills and/or power saws; electric power storage systems such as household battery systems that accumulate electric power in case of emergency and home energy servers (household electric power storage devices), electric power supply systems; electric power storage units and/or backup power sources; electrically driven vehicles such as electric vehicles, electric motorcycles, electric bicycles, and/or Segway (registered trademark); and electric power-driving force conversion devices (specifically, for example, motors for power) of aircrafts and/or ships, but are not limited to these uses.

Among these, it is effective that the magnesium secondary battery (for example, magnesium-sulfur secondary battery) is applied to battery packs, electrically driven vehicles, electric power storage systems, electric power supply systems, power tools, electronic apparatuses, electrical apparatuses and/or the like. A battery pack is a power source using a magnesium secondary battery, and is a so-called assembled battery or the like. An electrically driven vehicle is a vehicle which operates (for example, travels) using a magnesium secondary battery as a driving power source and may be a motor vehicle (for example, a hybrid electric vehicle) provided with a driving source other than the secondary battery. An electric power storage system (for example, an electric power supply system) is a system using a magnesium secondary battery as an electric power storage source. For example, in a household electric power storage system (for example, an electric power supply system), electric power is accumulated in a magnesium secondary battery which is an electric power storage source and household electric appliances and the like can be thus used by utilizing the electric power. A power tool is a tool in which a moving unit (for example, a drill) moves using a magnesium secondary battery as a driving power source. Electronic apparatuses and electrical apparatus are apparatuses which exert various functions using a magnesium secondary battery as a power source for operation (namely, a power supply source).

Hereinafter, a cylindrical magnesium secondary battery and a flat laminated film type magnesium secondary battery will be described.

Figure 2:
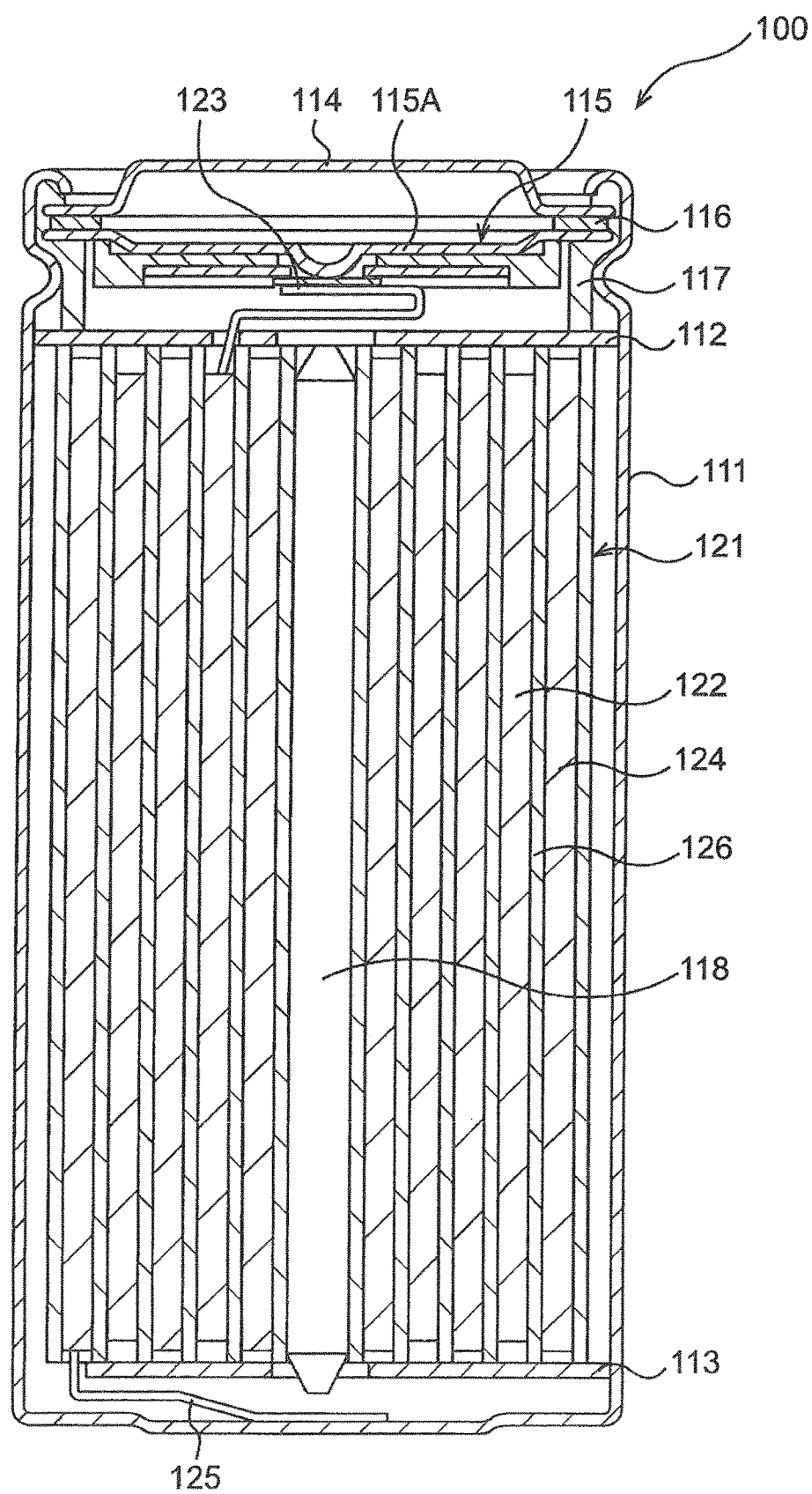
FIG. 2 is a schematic sectional view of a magnesium secondary battery (cylindrical magnesium secondary battery) provided as an embodiment of the present disclosure.

A schematic sectional view of a cylindrical magnesium secondary battery 100 is illustrated in FIG. 2. In the magnesium secondary battery 100, an electrode structure 121 and a pair of insulating plates 112 and 113 are housed inside an electrode structure housing member 111 having a substantially hollow columnar shape. The electrode structure 121 can be fabricated by, for example, laminating a positive electrode 122 and a negative electrode 124 with a separator 126 interposed therebetween to obtain an electrode structure and then winding the electrode structure. The electrode structure housing member (for example, a battery can) 111 has a hollow structure in which one end portion is closed and the other end portion is open, and is fabricated using iron (Fe), aluminum (Al) and/or the like. The pair of insulating plates 112 and 113 are disposed so as to sandwich the electrode structure 121 and extend perpendicularly to the winding peripheral face of the electrode structure 121. A battery lid 114, a safety valve mechanism 115, and a positive temperature coefficient element (PTC element) 116 are crimped to the open end portion of the electrode structure housing member 111 with a gasket 117 interposed therebetween, and the electrode structure housing member 111 is thus sealed. The battery lid 114 is fabricated using, for example, the same material as that for the electrode structure housing member 111. The safety valve mechanism 115 and the positive temperature coefficient element 116 are provided on the inner side of the battery lid 114, and the safety valve mechanism 115 is electrically connected to the battery lid 114 via the positive temperature coefficient element 116. In the safety valve mechanism 115, a disk plate 115A is reversed when the internal pressure is raised to a certain level or more by an internal short circuit, external heating and/or the like. The electrical connection between the battery lid 114 and the electrode structure 121 is thus disconnected. In order to prevent abnormal heat generation due to a large current, the resistance of the positive temperature coefficient element 116 increases as the temperature increases. Gasket 117 is fabricated using, for example, an insulating material. The surface of the gasket 117 may be coated with asphalt and the like.

A center pin 118 is inserted in the winding center of the electrode structure 121. However, the center pin 118 may not be inserted in the winding center. A positive electrode lead portion 123 fabricated using a conductive material such as aluminum is connected to the positive electrode 122. Specifically, the positive electrode lead portion 123 is attached to the positive electrode current collector. A negative electrode lead portion 125 fabricated using a conductive material such as copper is connected to the negative electrode 124. Specifically, the negative electrode lead portion 125 is attached to the negative electrode current collector. The negative electrode lead portion 125 is welded to the electrode structure housing member 111 and is electrically connected to the electrode structure housing member 111. The positive electrode lead portion 123 is welded to the safety valve mechanism 115 as well as is electrically connected to the battery lid 114. In the example illustrated in FIG. 2, the negative electrode lead portion 125 is provided at one location (the outermost peripheral portion of the wound electrode structure), but may be provided at two locations (the outermost peripheral portion and innermost peripheral portion of the wound electrode structure).

The electrode structure 121 is formed by laminating the positive electrode 122 having a positive electrode active material layer formed on the positive electrode current collector (more specifically, on both sides of the positive electrode current collector) and the negative electrode 124 having a negative electrode active material layer formed on the negative electrode current collector (specifically, on both sides of the negative electrode current collector) with the separator 126 interposed therebetween. The positive electrode active material layer is not formed in the region of the positive electrode current collector to which the positive electrode lead portion 123 is attached, and the negative electrode active material layer is not formed in the region of the negative electrode current collector to which the negative electrode lead portion 125 is attached.

The magnesium secondary battery 100 can be fabricated, for example, based on the following procedure.

First, a positive electrode active material layer is formed on both sides of a positive electrode current collector to form a positive electrode, and a negative electrode active material layer is formed on a negative electrode current collector to obtain a negative electrode. As this negative electrode, the above-described "magnesium-containing electrode" may be utilized.

Subsequently, the positive electrode lead portion 123 is attached to the positive electrode current collector by a welding method and the like. The negative electrode lead portion 125 is attached to the negative electrode current collector by a welding method and the like. Next, the positive electrode 122 and the negative electrode 124 are laminated with the separator 126 formed of a microporous polyethylene film interposed therebetween and the laminated body is wound (more specifically, the electrode structure (namely, the laminated structure) of the positive electrode 122/separator 126/negative electrode 124/separator 126 is wound) to fabricate the electrode structure 121, and a protective tape (not illustrated) is attached to the outermost peripheral portion of the electrode structure 121. After that, the center pin 118 is inserted into the center of the electrode structure 121. Subsequently, the electrode structure 121 is housed inside the electrode structure housing member 111 while being sandwiched between the pair of insulating plates 112 and 113. In this case, the tip portion of the positive electrode lead portion 123 is attached to the safety valve mechanism 115 and the tip portion of the negative electrode lead portion 125 is attached to the electrode structure housing member 111 by a welding method and the like. Thereafter, the electrolytic solution is injected based on the reduced pressure method to impregnate the separator 126 with the electrolytic solution. Subsequently, the battery lid 114, the safety valve mechanism 115, and the positive temperature coefficient element 116 are crimped at the opening end portion of the electrode structure housing member 111 with the gasket 117 interposed therebetween.

Figure 3:
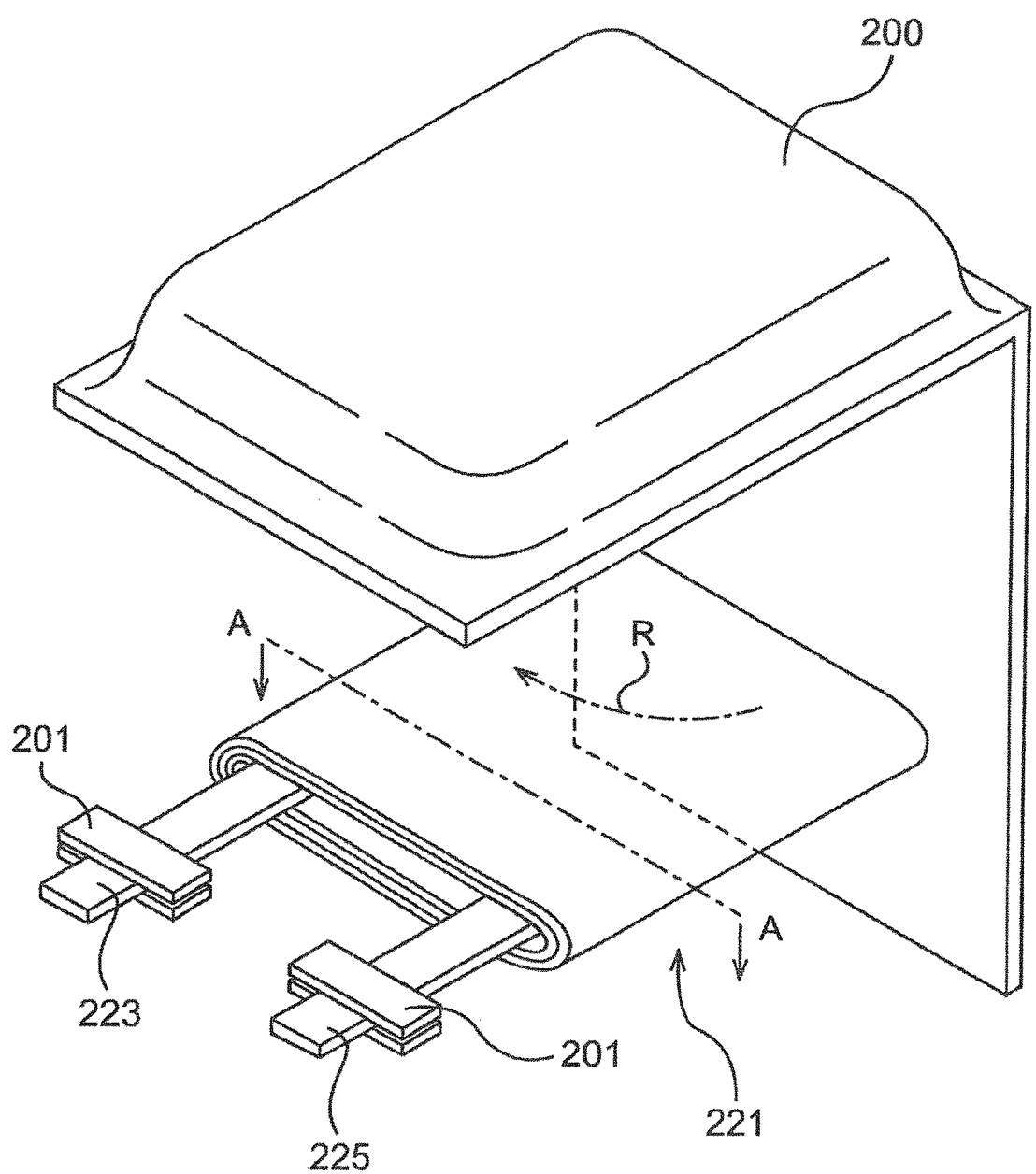
FIG. 3 is a schematic perspective view of a magnesium secondary battery (flat laminated film type magnesium secondary battery) provided as an embodiment of the present disclosure.

Next, a flat laminated film type secondary battery will be described. A schematic exploded perspective view of this secondary battery is illustrated in FIG. 3. In this secondary battery, an electrode structure 221 basically the same as that described above is housed inside an exterior member 200 formed of a laminated film. The electrode structure 221 can be fabricated by laminating a positive electrode and a negative electrode with a separator and an electrolyte layer interposed therebetween and then winding this electrode structure. A positive electrode lead portion 223 is attached to the positive electrode and a negative electrode lead portion 225 is attached to the negative electrode. The outermost peripheral portion of the electrode structure 221 is protected by a protective tape. The positive electrode lead portion 223 and the negative electrode lead portion 225 protrude in the same direction from the inside to the outside of the exterior member 200. The positive electrode lead portion 223 is formed of a conductive material such as aluminum. The negative electrode lead portion 225 is formed of a conductive material such as copper, nickel, and/or stainless steel.

The exterior member 200 is, for example, one sheet of film capable of being folded in the direction of the arrow R illustrated in FIG. 3, and a part of the exterior member 200 is provided with a hollow (for example, embossment) for housing the electrode structure 221. This exterior member 200 is, for example, a laminated film in which a fusion layer, a metal layer, and a surface protective layer are laminated in this order. In the fabricating process of the secondary battery, the exterior member 200 is folded so that the fusion layers face each other with the electrode structure 221 interposed therebetween, and then the peripheral edge portions of the fusion layers are fused to each other. However, the exterior member 200 may be one in which two sheets of separate laminated films are pasted to each other with an adhesive or the like interposed therebetween. The fusion layer is formed of, for example, a film of polyethylene, polypropylene and/or the like. The metal layer is formed of, for example, aluminum foil. The surface protective layer is formed of, for example, nylon and/or polyethylene terephthalate. Among these, the exterior member 200 is preferably an aluminum laminated film in which a polyethylene film, an aluminum foil, and a nylon film are laminated in this order. However, the exterior member 200 may be a laminated film having another laminated structure, a polymer film formed of polypropylene or the like, or a metal film. Specifically, the exterior member 200 may be formed of a moisture resistant aluminum laminated film in which a nylon film, an aluminum foil, and an unstretched polypropylene film are laminated in this order from the outer side.

A close contact film 201 is inserted between the exterior member 200 and the positive electrode lead portion 223 and between the exterior member 200 and the negative electrode lead portion 225 in order to prevent the intrusion of outside air. The close contact film 201 may be formed of a material exhibiting close contact property to the positive electrode lead portion 223 and the negative electrode lead portion 225, for example, a polyolefin resin or the like, more specifically, a polyolefin resin such as polyethylene, polypropylene, modified polyethylene, or modified polypropylene.

Although the description has focused primarily on secondary batteries above, the disclosure also applies to other electrochemical devices, for example, capacitors, air batteries, and fuel cells in the same manner. Hereinafter, this will be described.

Figure 4:
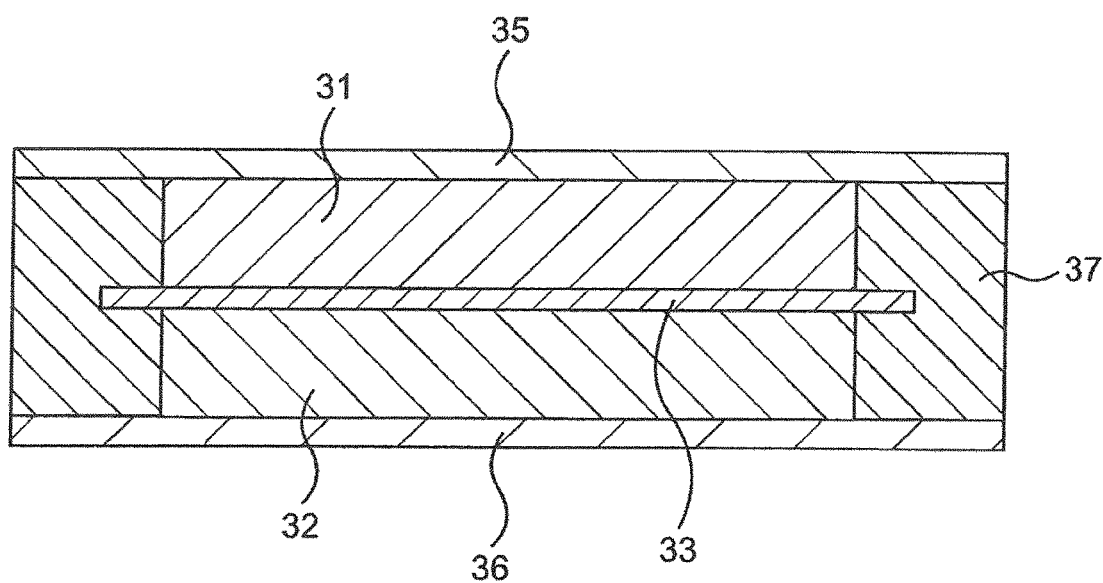
FIG. 4 is a schematic sectional view of an electrochemical device provided as a capacitor in an embodiment of the present disclosure.

The electrochemical device of the present disclosure can be provided as a capacitor of which a schematic sectional view is illustrated in FIG. 4. In the capacitor, a positive electrode 31 and a negative electrode 32 are disposed so as to face each other with a separator 33, which is impregnated with an electrolytic solution, interposed therebetween. A gel electrolyte membrane impregnated with an electrolytic solution may be disposed on the surface of at least one of the separator 33, the positive electrode 31, or the negative electrode 32. Reference numbers 35 and 36 indicate current collectors, and a reference number 37 indicates a gasket.

Figure 5:
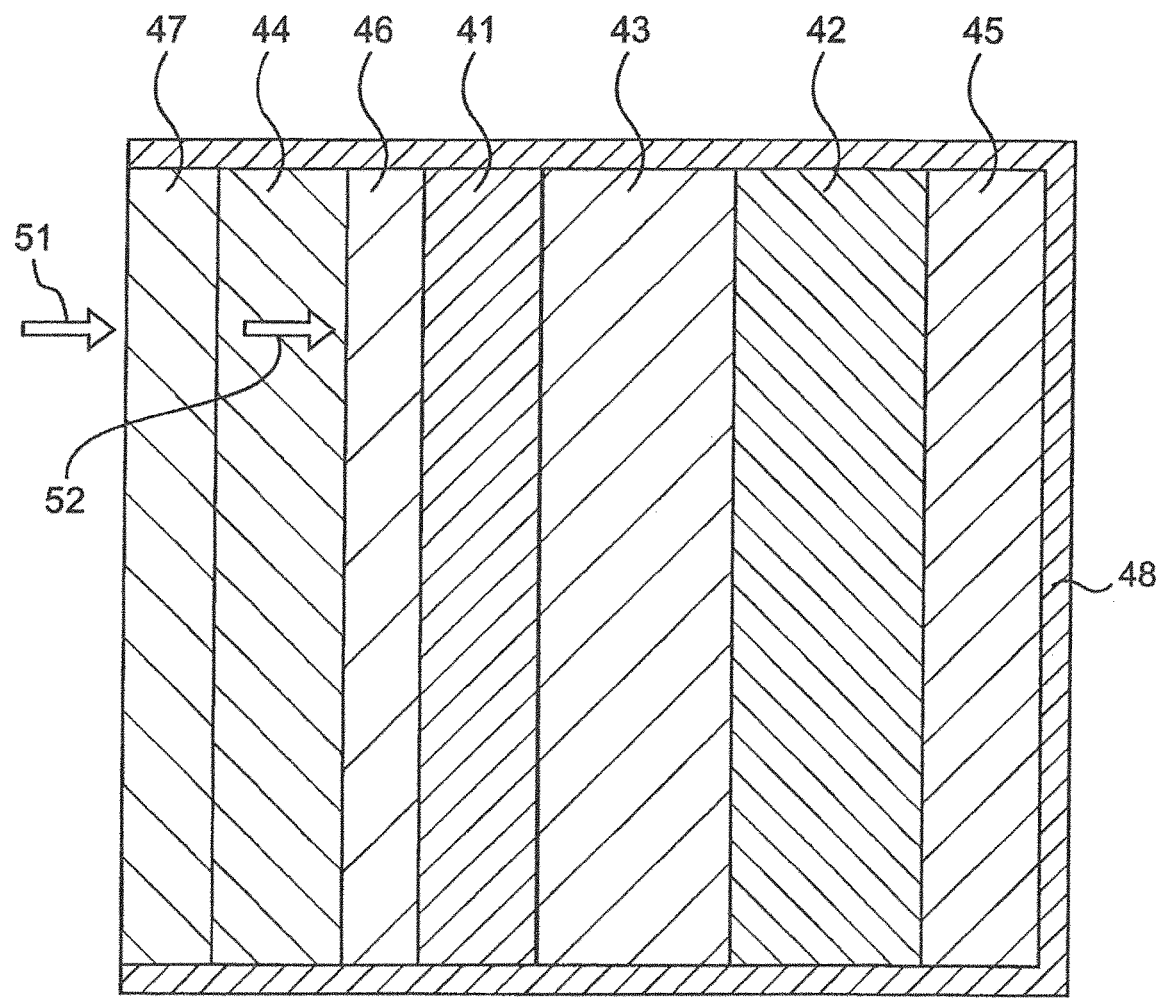
FIG. 5 is a schematic sectional view of an electrochemical device provided as an air battery in an embodiment of the present disclosure.

Alternatively, the electrochemical device of the present disclosure can also be provided as an air battery as illustrated in the conceptual diagram of FIG. 5. This air battery includes, for example, an oxygen selective permeable membrane 47, through which water vapor hardly permeates and oxygen selectively permeates; an air electrode side current collector 44 formed of a conductive porous material; a porous diffusion layer 46, which is formed of a conductive material and is disposed between the air electrode side current collector 44 and a porous positive electrode 41; the porous positive electrode 41 containing a conductive material and a catalytic material; separator and electrolytic solution (or solid electrolyte containing electrolytic solution) 43, through which water vapor hardly permeates; a negative electrode 42 including a magnesium foil capable of releasing magnesium ions; a negative electrode side current collector 45; and an exterior body 48 in which each of these layers is housed.

Oxygen 52 in air (for example, atmospheric air) 51 selectively permeates through the oxygen selective permeable membrane 47, passes through the air electrode side current collector 44 formed of a porous material, is diffused by the diffusion layer 46, and is supplied to the porous positive electrode 41. The progress of a part of oxygen permeated the oxygen selective permeable membrane 47 is blocked by the air electrode side current collector 44, but oxygen that has passed through the air electrode side current collector 44 is diffused by the diffusion layer 46, spreads, and thus is efficiently distributed throughout the porous positive electrode 41. The supply of oxygen to the whole surface of the porous positive electrode 41 is not obstructed by the air electrode side current collector 44. Deterioration due to the influence of moisture in the air is minor since the permeation of water vapor is suppressed by the oxygen selective permeable membrane 47, and the battery output can be increased and the battery can be stably used for a long period of time since oxygen is efficiently supplied to the whole porous positive electrode 41.

Figure 6:
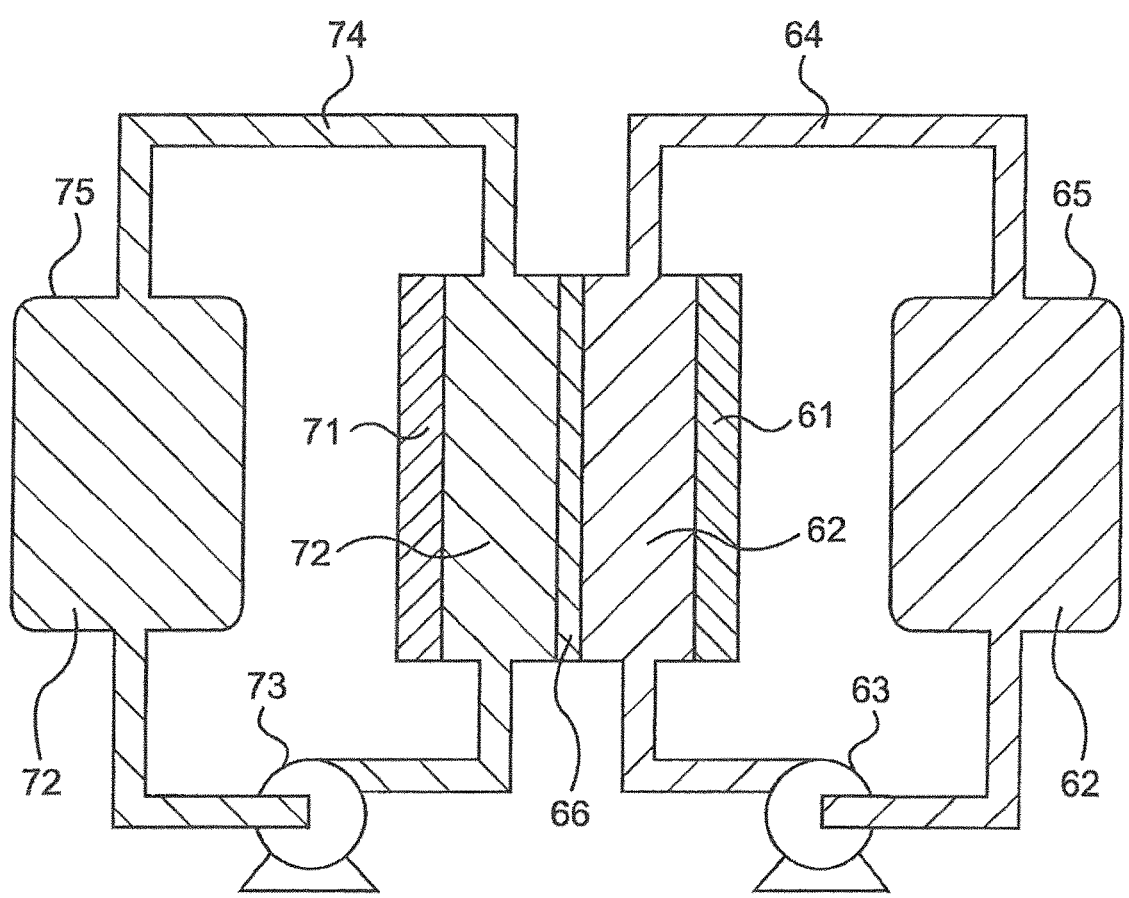
FIG. 6 is a schematic sectional view of an electrochemical device provided as a fuel cell in an embodiment of the present disclosure.

Alternatively, the electrochemical device of the present disclosure can also be provided as a fuel cell as illustrated in the conceptual diagram of FIG. 6. The fuel cell includes, for example, a positive electrode 61, a positive electrode electrolytic solution 62, a positive electrode electrolytic solution transporting pump 63, a fuel flow path 64, a positive electrode electrolytic solution storing container 65, a negative electrode 71, a negative electrode electrolytic solution 72, a negative electrode electrolytic solution transporting pump 73, a fuel flow path 74, a negative electrode electrolytic solution storing container 75, and an ion exchange membrane 66. The positive electrode electrolytic solution 62 continuously or intermittently flows (circulates) in the fuel flow path 64 via the positive electrode electrolytic solution storing container 65 and the positive electrode electrolytic solution transporting pump 63. The negative electrode electrolytic solution 72 continuously or intermittently flows or circulates in the fuel flow path 74 via the negative electrode electrolytic solution storing container 75 and the negative electrode electrolytic solution transporting pump 73. Power generation occurs between the positive electrode 61 and the negative electrode 71.

The electrochemical device of the present disclosure can be used particularly as a magnesium secondary battery as described with reference to FIGS. 1 to 3, and several application examples of this magnesium secondary battery will be described more specifically. The configuration of each application example described below is merely an example, and the configuration can be changed as appropriate.

A magnesium secondary battery can be used in the form of a battery pack. This battery pack is a simple battery pack (so-called soft pack) fabricated using a magnesium secondary battery, and is mounted on, for example, electronic apparatuses typified by smartphones. Alternatively or additionally, the battery pack may include an assembled battery including six magnesium secondary batteries connected to be two parallel three series. The magnesium secondary batteries may be connected in series, in parallel, or in a mixed type of these.

Figure 7:
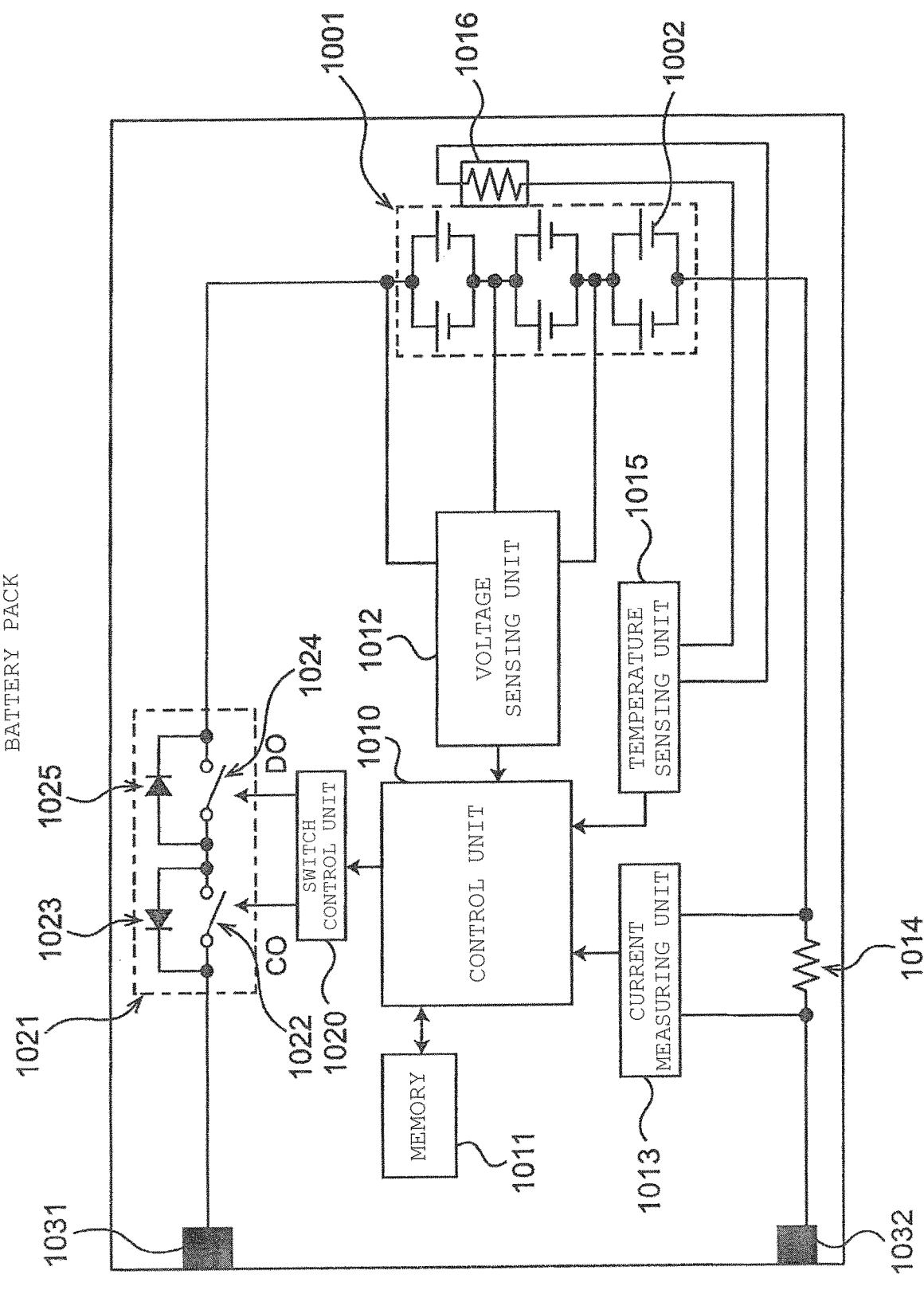
FIG. 7 is a block diagram illustrating an example of a circuit configuration when a magnesium secondary battery provided as an embodiment of the present disclosure is applied to a battery pack.

FIG. 7 illustrates a block diagram showing an example of the circuit configuration when the magnesium secondary battery according to the present disclosure is applied to a battery pack. The battery pack includes a cell (for example, an assembled battery) 1001, an exterior member, a switch unit 1021, a current sensing resistor 1014, a temperature sensing element 1016, and a control unit 1010. The switch unit 1021 includes a charge control switch 1022 and a discharge control switch 1024. The battery pack includes a positive electrode terminal 1031 and a negative electrode terminal 1032. At the time of charge, the positive electrode terminal 1031 and the negative electrode terminal 1032 are connected to the positive electrode terminal and negative electrode terminal of the charger, respectively, and charge is performed. When an electronic apparatus is used, the positive electrode terminal 1031 and the negative electrode terminal 1032 are connected to the positive electrode terminal and negative electrode terminal of the electronic apparatus, respectively, and discharge is performed.

The cell 1001 is configured by connecting a plurality of magnesium secondary batteries 1002 according to the present disclosure in series and/or in parallel. FIG. 7 illustrates a case where six magnesium secondary batteries 1002 are connected in two parallel three series (2P3S). In addition, the connection method may be any the connection method such as p parallel q series (where p and q are integers).

The switch unit 1021 includes the charge control switch 1022 and a diode 1023 and a discharge control switch 1024 and a diode 1025, and is controlled by the control unit 1010. The diode 1023 exhibits polarity in the backward direction with respect to the charge current flowing from the positive electrode terminal 1031 toward the cell 1001 and in the forward direction with respect to the discharge current flowing from the negative electrode terminal 1032 toward the cell 1001. The diode 1025 exhibits polarity in the forward direction with respect to the charge current and in the backward direction with respect to the discharge current. In the example, the switch portion is provided on the plus (+) side but may be provided on the minus (−) side. The charge control switch 1022 is put into a closed state when the battery voltage reaches the overcharge detection voltage, and is controlled by the control unit 1010 so that the charge current does not flow in the current path of the cell 1001. After the charge control switch 1022 is put into a closed state, only discharge is possible through the diode 1023. The charge control switch 1022 is put into a closed state when a large current flows during charge, and is controlled by the control unit 1010 so as to cut off the charge current flowing in the current path of the cell 1001. The discharge control switch 1024 is put into a closed state when the battery voltage reaches the overdischarge detection voltage, and is controlled by the control unit 1010 so that the discharge current does not flow in the current path of the cell 1001. After the discharge control switch 1024 is put into a closed state, only charge is possible through the diode 1025. The discharge control switch 1024 is put into a closed state when a large current flows during discharge, and is controlled by the control unit 1010 so as to cut off the discharge current flowing in the current path of the cell 1001.

The temperature sensing element 1016 includes, for example, a thermistor and is provided in the vicinity of the cell 1001. The temperature measuring unit 1015 measures the temperature of the cell 1001 using the temperature sensing element 1016, and sends the measurement result to the control unit 1010. A voltage measuring unit 1012 measures the voltage of the cell 1001 and the voltage of each magnesium secondary battery 1002 constituting the cell 1001, A/D-converts the measurement result, and sends the A/D-converted result to the control unit 1010. The current measuring unit 1013 measures the current using the current sensing resistor 1014, and sends the measurement result to the control unit 1010.

The switch control unit 1020 controls the charge control switch 1022 and discharge control switch 1024 of the switch unit 1021 based on the voltage and current sent from the voltage measuring unit 1012 and current measuring unit 1013. The switch control unit 1020 prevents overcharge, overdischarge, and overcurrent charge and discharge by sending a control signal to the switch unit 1021 when the voltage of any of the magnesium secondary batteries 1002 falls below the overcharge detection voltage or overdischarge detection voltage, and/or when a large current suddenly flows. The charge control switch 1022 and the discharge control switch 1024 can be configured by, for example, a semiconductor switch such as a MOSFET. In this case, the diodes 1023 and 1025 are configured by the parasitic diodes of the MOSFET. In the case of using a p-channel FET as the MOSFET, the switch control unit 1020 supplies a control signal DO and a control signal CO to the gate portion of each of the charge control switch 1022 and the discharge control switch 1024. The charge control switch 1022 and the discharge control switch 1024 are conducted by a gate potential lower than the source potential by a predetermined value or more. In other words, in normal charge and discharge operations, the control signal CO and the control signal DO are set to low levels, and the charge control switch 1022 and the discharge control switch 1024 are put into a conductive state. For example, at the time of overcharge or overdischarge, the control signal CO and the control signal DO are set to high levels, and the charge control switch 1022 and the discharge control switch 1024 are put into a closed state.

A memory 1011 includes, for example, Erasable Programmable Read Only Memory (EPROM) that is a non-volatile memory. In the memory 1011, the numerical value calculated by the control unit 1010, the internal resistance value of the magnesium secondary battery in the initial state of each magnesium secondary battery 1002 measured at the stage of the fabricating process, and/or the like are stored in advance, and can be rewritten as appropriate. By storing the fully charged capacity of the magnesium secondary battery 1002, for example, the remaining capacity can be calculated together with the control unit 1010.

The temperature measuring unit 1015 measures the temperature using the temperature sensing element 1016, performs charge and discharge control when abnormal heat generation occurs, and corrects the calculation of the remaining capacity.

Figure 8A:
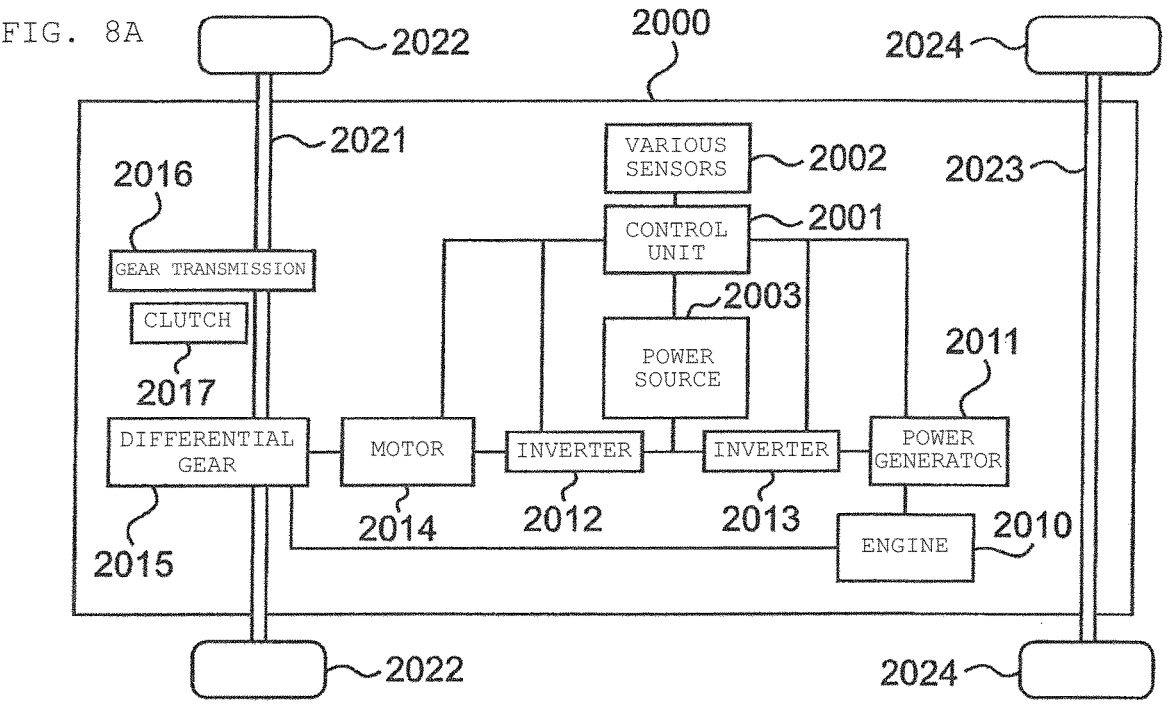
FIGS. 8A, 8B, and 8C are block diagrams illustrating the configurations of an electrically driven vehicle, an electric power storage system, and a power tool to which a magnesium secondary battery is applied as an embodiment of the present disclosure, respectively.

Next, the application of the magnesium secondary battery to an electrically driven vehicle will be described. FIG. 8A illustrates a block diagram showing the configuration of an electrically driven vehicle such as a hybrid electric vehicle, which is an example of an electrically driven vehicle. The electrically driven vehicle includes, for example, a control unit 2001, various sensors 2002, a power source 2003, an engine 2010, a power generator 2011, inverters 2012 and 2013, a motor for driving 2014, a differential gear 2015, a gear transmission 2016, and a clutch 2017 inside a metal housing 2000. In addition to these, the electrically driven vehicle includes, for example, a front wheel drive shaft 2021 connected to the differential gear 2015 and/or gear transmission 2016, front wheels 2022, a rear wheel drive shaft 2023, and rear wheels 2024.

The electrically driven vehicle can travel, for example, by using either of the engine 2010 or the motor 2014 as a driving source. The engine 2010 is a main power source, and examples thereof include a gasoline engine. In the case of using the engine 2010 as a source of power the driving force (for example, torque) of the engine 2010 is transmitted to the front wheels 2022 and the rear wheels 2024 via, for example, the differential gear 2015, the gear transmission 2016, and the clutch 2017, which are driving units. The torque of the engine 2010 is also transmitted to the power generator 2011, the power generator 2011 generates alternating current power utilizing the torque, the alternating current power is converted into direct current power by the inverter 2013, and the direct current power is accumulated in the power source 2003. Meanwhile, in the case of using the motor 2014 which is a converter as a source of power, the electric power (for example, direct current power) supplied from the power source 2003 is converted into alternating current power by the inverter 2012, and the motor 2014 is driven utilizing the alternating current power. The driving force (for example, torque) converted from electric power by the motor 2014 is transmitted to the front wheels 2022 and the rear wheels 2024, for example, via the differential gear 2015, the gear transmission 2016, and the clutch 2017 which are driving units.

When the electrically driven vehicle is decelerated by the brake mechanism (not illustrated), the resistance force at the time of deceleration may be transmitted to the motor 2014 as a torque, and the motor 2014 may generate alternating current power utilizing this torque. The alternating current power is converted into direct current power by the inverter 2012, and the direct current regenerative electric power is accumulated in the power source 2003.

The control unit 2001 controls the operation of the whole electrically driven vehicle, and includes, for example, a CPU. The power source 2003 can include one or two or more magnesium secondary batteries (not illustrated) according to the present disclosure. The power source 2003 can also be configured to accumulate electric power by being connected to an external power source and receiving supply of electric power from the external power source. The various sensors 2002 are used, for example, to control the number of revolutions of the engine 2010 and to control the opening (throttle opening) of the throttle valve (not illustrated). The various sensors 2002 include, for example, a speed sensor, an acceleration sensor, and/or an engine rpm sensor.

A case where the electrically driven vehicle is a hybrid electric vehicle has been described, but the electrically driven vehicle may be a vehicle (for example, an electric vehicle) which operates using only the power source 2003 and the motor 2014 without using the engine 2010.

Figure 8B:
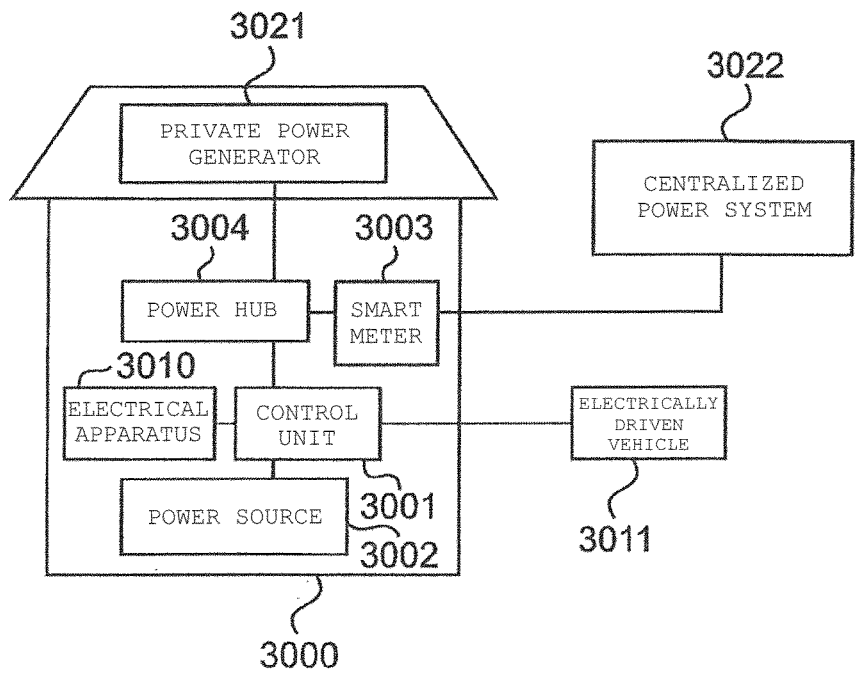

Next, the application of the magnesium secondary battery to an electric power storage system (for example, an electric power supply system) will be described. FIG. 8B illustrates a block diagram showing the configuration of an electric power storage system (for example, an electric power supply system). The electric power storage system includes, for example, a control unit 3001, a power source 3002, a smart meter 3003, and a power hub 3004 inside a house 3000 such as a general residence and a commercial building.

The power source 3002 can be connected to, for example, an electrical apparatus (for example, an electronic apparatus) 3010 installed inside the house 3000 and an electrically driven vehicle 3011 stopped outside the house 3000. The power source 3002 can be connected to, for example, a private power generator 3021 installed in the house 3000 via the power hub 3004 and an external centralized electric power system 3022 via the smart meter 3003 and the power hub 3004. The electrical apparatus (electronic apparatus) 3010 includes, for example, one or two or more home appliances. Examples of home appliances include refrigerators, air conditioners, television receivers, and/or hot-water supply system. The private power generator 3021 includes, for example, a solar power generator and/or a wind power generator. Examples of the electrically driven vehicle 3011 include an electric vehicle, a hybrid electric vehicle, an electric motorcycle, an electric bicycle, and/or a Segway (registered trademark). Examples of the centralized electric power system 3022 include a commercial power source, power generation devices, power grids, and/or smart grids (for example, next-generation power grids). Examples of the centralized electric power system 3022 also include thermal power plants, nuclear power plants, hydroelectric power plants, and/or wind power plants. Examples of the power generation device provided in the centralized electric power system 3022 include, but are not limited to, various solar cells, fuel cells, wind power generation devices, micro hydroelectric power generation devices, and/or geothermal power generation devices.

The control unit (controller) 3001 controls the operation of the whole electric power storage system (including the usage state of the power source 3002), and includes, for example, a CPU, a processor or the like. The power source 3002 can include one or two or more magnesium secondary batteries (not illustrated) according to the present disclosure. The smart meter 3003 is, for example, a network-compatible electric power meter installed in the house 3000 of the electric power demand side and can communicate with the electric power supply side. The smart meter 3003 enables efficient and stable energy supply, for example, by controlling the balance between the supply and demand of electric power in the house 3000 while communicating with the outside.

In this electric power storage system, for example, electric power from the centralized electric power system 3022 which is an external power source is accumulated in the power source 3002 via the smart meter 3003 and the power hub 3004 as well as from the private power generator 3021 which is an independent power source 3002 via the power hub 3004. The electric power accumulated in the power source 3002 is supplied to the electrical apparatus (for example, an electronic apparatus) 3010 and the electrically driven vehicle 3011 in accordance with the instruction from the control unit 3001, and thus the electrical apparatus (for example, an electronic apparatus) 3010 can be operated as well as the electrically driven vehicle 3011 can be charged. In other words, the electric power storage system is a system which allows the accumulation and supply of electric power in the house 3000 to be performed using the power source 3002.

The electric power accumulated in the power source 3002 can be arbitrarily utilized. For this reason, for example, electric power from the centralized electric power system 3022 can be accumulated in the power source 3002 at midnight at which the electricity usage fee is low, and the electric power accumulated in this power source 3002 can be used during the day during which the electricity usage fee is high.

The electric power storage system described above may be installed for each house (for example, one household) or for a plurality of houses (for example, multiple households).

Figure 8C:
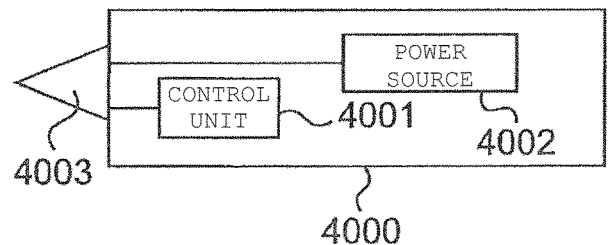

Next, the application of the magnesium secondary battery to a power tool will be described. FIG. 8C illustrates a block diagram showing the configuration of a power tool. The power tool is, for example, an electric drill, and includes a control unit 4001 and a power source 4002 inside a tool body 4000 fabricated using a plastic material and the like. For example, a drill unit 4003, which is a moving unit, is attached to the tool body 4000 so as to rotate. The control unit 4001 controls the operation of the whole power tool (including the usage state of the power source 4002), and includes, for example, a CPU. The power source 4002 can include one or two or more magnesium secondary batteries (not illustrated) according to the present disclosure. The control unit 4001 supplies electric power from the power source 4002 to the drill unit 4003 in accordance with the operation of the operation switch (not illustrated).

The embodiments of the present disclosure have been described above, but they merely exemplify typical examples. Hence, those skilled in the art will easily understand that the present disclosure is not limited to this, and various aspects can be considered without changing the gist of the present disclosure.

For example, in the above, an aspect in which the metal material used in the plating process is used as an electrode together with the magnesium foil is mentioned, but the present disclosure is not limited thereto. A magnesium foil taken out by peeling off the plated and precipitated magnesium from the metal material may be used as an electrode. In this case, the magnesium foil may be used not only as a simple substance thereof but also in the form of a composite in combination with other members.

The composition of the plating solution, the raw materials used in the fabrication, the fabrication method, the fabrication conditions, the properties of the plating solution, and the configurations and structures of the electrodes and electrochemical devices described above are examples, and the present disclosure is not limited to these and can be changed as appropriate.

EXAMPLES

The following demonstration tests were conducted to confirm the effects of the present disclosure.

Specifically, a plating solution A of an ether-based solvent containing a "magnesium salt having a disilazide structure" and a plating solution B of an ether-based solvent not containing a "magnesium salt having a disilazide structure" were prepared, and it was attempted to fabricate a magnesium electrode using these by a plating method.

As the plating solution A, a plating solution, which contained a magnesium salt having a disilazide structure and had the following composition, was prepared.

Ether solvent: dimethoxyethane/DME (ethylene glycol dimethyl ether) manufactured by TOMIYAMA PURE CHEMICAL INDUSTRIES, LTD.

Magnesium salt: "first magnesium salt having disilazide structure represented by general formula $(R_3Si)_2N$" and "second magnesium salt not having disilazide structure"

First magnesium salt: $Mg(HMDS)_2$, 0.29 M, manufactured by Sigma-Aldrich Co. LLC Second magnesium salt: metal halide salt ($MgCl_2$ (anhydrous), 1.14 M, manufactured by Sigma-Aldrich Co. LLC) and metal imide salt ($Mg(TFSI)_2$, 0.57 M, manufactured by TOMIYAMA PURE CHEMICAL INDUSTRIES, LTD.)

$MgCl_2:Mg(TFSI)_2:Mg(HMDS)_2=2:1:0.5$

DME was added so as to contain 1.14 M $MgCl_2$, 0.57 M $Mg(TFSI)_2$, and 0.29 M $Mg(HMDS)_2$, heating was performed to 120° C., and mixing was performed to obtain the plating solution A.

As can be seen from the above, this plating solution A corresponds to a plating solution containing a "magnesium salt having a disilazide structure" and a "magnesium salt not having a disilazide structure".

As the plating solution B, a plating solution, which did not contain a magnesium salt having a disilazide structure and had the following composition, was prepared.

Ether solvent: dimethoxyethane/DME (ethylene glycol dimethyl ether) manufactured by TOMIYAMA PURE CHEMICAL INDUSTRIES, LTD.

Magnesium salt: "second magnesium salt not having a disilazide structure" mentioned above Second magnesium salt: metal halide salt ($MgCl_2$ (anhydrous), 1.33 M, manufactured by Sigma-Aldrich Co. LLC) and metal imide salt ($Mg(TFSI)_2$, 0.67 M, manufactured by TOMIYAMA PURE CHEMICAL INDUSTRIES, LTD.)

$MgCl_2:Mg(TFSI)_2:Mg(HMDS)_2=2:1:0$

DME was added so as to contain 1.33 M $MgCl_2$ and 0.67 M $Mg(TFSI)_2$, heating was performed to 120° C., and mixing was performed to obtain the plating solution B.

As can be seen from the above, this plating solution B corresponds to a plating solution which does not contain a "magnesium salt having a disilazide structure" but contains only a "magnesium salt not having a disilazide structure" with regard to the magnesium salt.

Example 1

Electroless plating was performed using the plating solution A under the following conditions to obtain magnesium precipitates (more specifically, a magnesium foil was formed on the Cu foil of the following object to be plated).

Object to be plated, which has been immersed in plating solution: Li foil (20 μm)/Cu foil (10 μm)
Temperature of plating solution: 25° C.

Example 2

Electroplating was performed using the plating solution A under the following conditions to obtain magnesium precipitates (more specifically, a magnesium foil was formed on the Cu foil of the following working electrode).
Working electrode: Cu foil (10 μm)
Counter electrode: Mg electrode (15 mmϕ)
Current density: 0.06 mA/cm$^2$
Energizing time: 1 hour
Temperature of plating solution: 25° C.

Comparative Example 1

Electroless plating was performed using the plating solution B under the following conditions to obtain magnesium precipitates.
Object to be plated, which has been immersed in plating solution: Li (20 μm)/Cu (10 μm)
Temperature of plating solution: 25° C.
(Results)
FIG. 9 illustrates SEM images of Mg precipitates in Example 1, FIG. 10 illustrates SEM images of Mg precipitates in Example 2, and FIG. 11 illustrates SEM images of Mg precipitates in Comparative Example 1. SEM images were acquired by taking an image using a scanning electron microscope, model JSM-6700F manufactured by JEOL Ltd.

As can be seen from FIGS. 9 to 11, precipitated Mg having a bulky shape such as an elongated shape or a needle shape was observed (FIG. 11) when the plating method is carried out using a plating solution (plating solution B) of an ether-based solvent that did not contain a "magnesium salt having a disilazide structure". However, precipitated Mg was observed as a granular precipitate (FIGS. 9 and 10) when the plating method is carried out using a plating solution (plating solution A) of an ether-based solvent containing a "magnesium salt having a disilazide structure".

Hence, it has been found that precipitated Mg having a "grain"-like shape, namely, a shape which may allow the grown plating film to be relatively "dense", is generated by using a plating solution containing a "magnesium salt having a disilazide structure", particularly a plating solution containing "a first magnesium salt having a disilazide structure" and "a second magnesium salt not having a disilazide structure". In other words, it has been understood that it is possible to obtain a metal foil (Mg metal film in the order of microns) in which magnesium is more "densely" packed by following the fabrication method of the present disclosure. Consequently, an electrode having a higher magnesium packing density can be obtained as a magnesium-containing electrode, and as a result, a negative electrode having a higher energy density can be obtained, and it has been thus found that there is the possibility that the miniaturization of an electrochemical device is achieved.

Figure 10A:
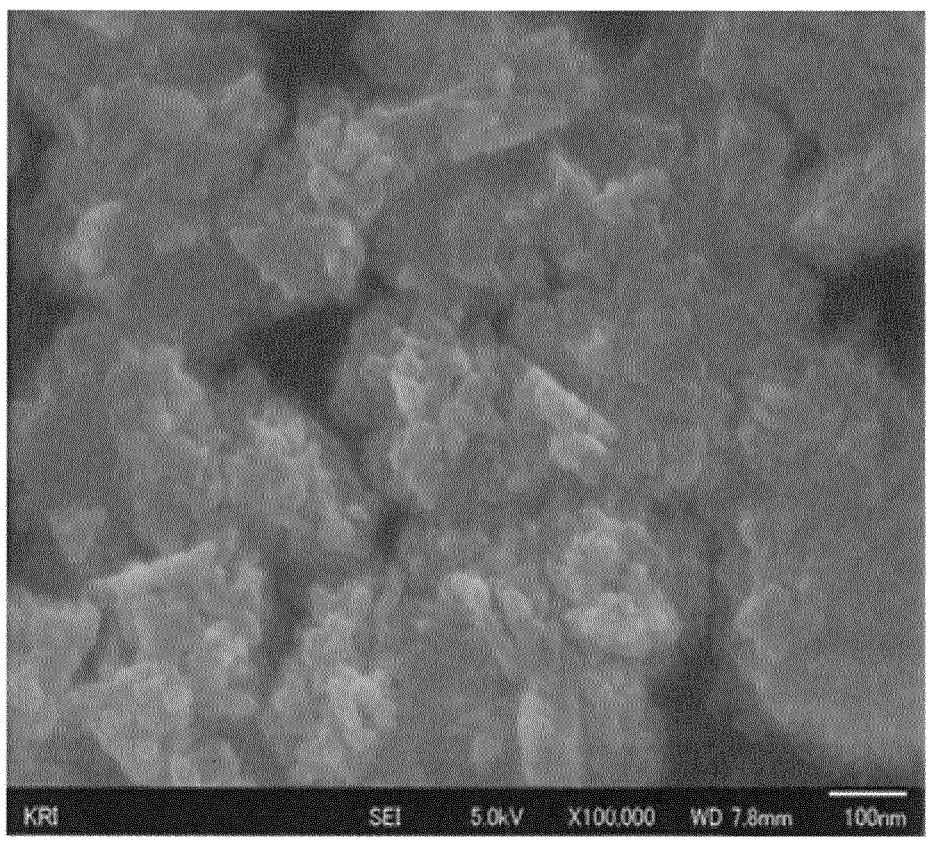
FIGS. 10A and 10B are SEM images of precipitated Mg observed in Example 2 in [Examples] of the present disclosure (FIG. 10A: magnification of 100,000-fold, FIG. 10B: magnification of 10,000-fold).
Figure 10B:
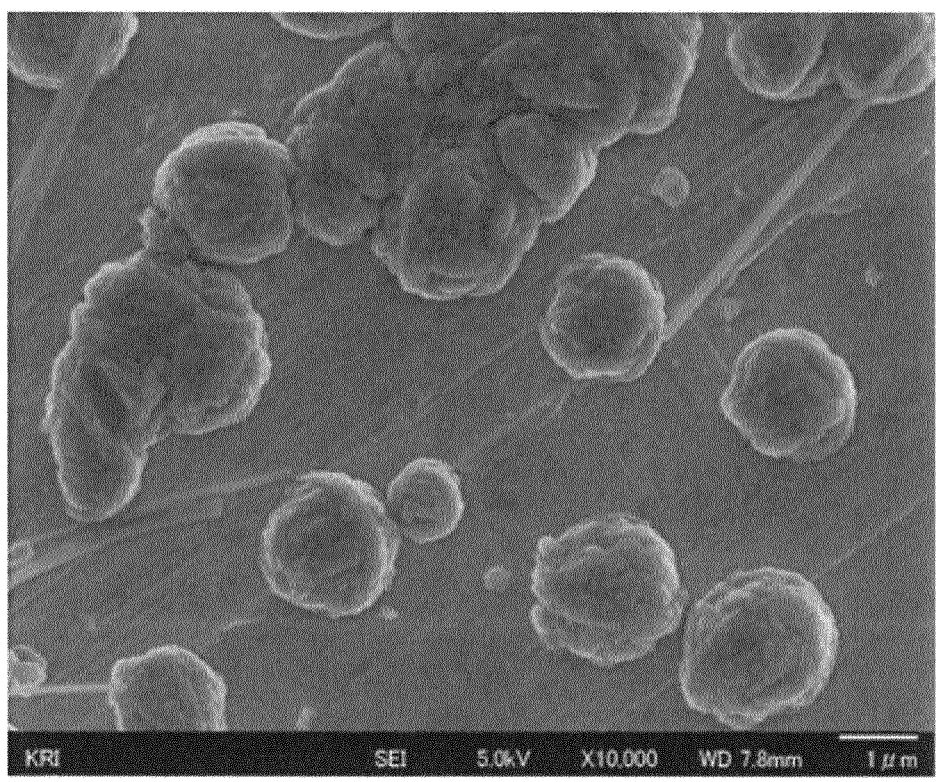

The granular precipitates on the SEM images obtained in Examples 1 and 2 have an aspect ratio of 0.9 to 1.1 (Example 1: granular precipitates in FIG. 9(a), Example 2: precipitates particularly on the surface among the widespread ones in FIG. 10(a)). It has also been found that particularly the shape of the precipitated Mg is a substantially regular hexagon in Example 1. In other words, it has also been found that particularly the precipitated magnesium is "densely" packed and easily grows in such a geometric grain shape and an electrode having a higher magnesium packing density can be obtained as a magnesium-containing electrode.

Figure 12:
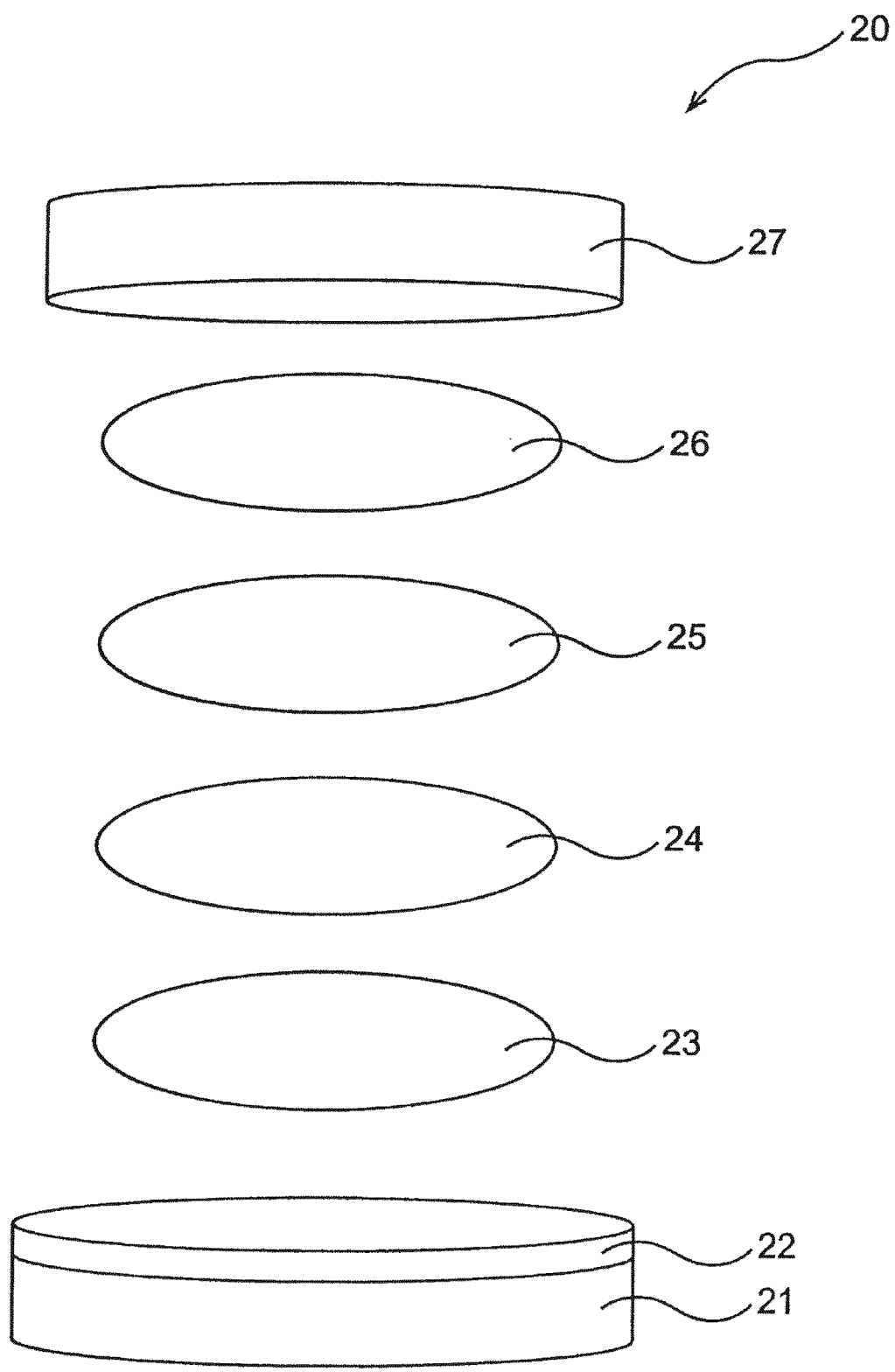
FIG. 12 is a developed view schematically illustrating a battery fabricated in [Demonstration test of magnesium electrode-based electrochemical device] of the present disclosure.

An electrochemical device was fabricated using the "magnesium electrode obtained by a plating method". Specifically, a magnesium-sulfur secondary battery having the following specifications was fabricated.
(Specifications of Magnesium-Sulfur Secondary Battery)
Negative electrode: electroless plated magnesium foil obtained according to Example 1 was used.
Positive electrode: sulfur electrode (electrode (product number 197-17892 manufactured by FUJIFILM Wako Pure Chemical Corporation) containing S$_8$ sulfur at 10% by mass, containing Ketjenblack (KB) (product number ECP600JD manufactured by Lion Corporation) as a conductive auxiliary agent at 65% by mass, and containing polytetrafluoroethylene (PTFE) (product number CD-1E manufactured by AGC Inc.) as a binder at 25% by weight)
Separator: glass fiber (glass fiber, product number GC50 manufactured by ADVANTEC (Toyo Roshi Kaisha, Ltd.))
Electrolytic solution
Magnesium salt: metal halide salt (MgCl$_2$ (anhydrous), 0.8 M, product number 449172 manufactured by Sigma-Aldrich Co. LLC) and metal imide salt (Mg(TFSI)$_2$, 0.8 M, product number MGTFSI manufactured by TOMIYAMA PURE CHEMICAL INDUSTRIES, LTD.)
Solvent: dimethoxyethane (super dehydrated grade), (product number DME manufactured by TOMIYAMA PURE CHEMICAL INDUSTRIES, LTD.)
Secondary battery form: coin battery CR2016 type FIG. 12 illustrates a schematically developed view of the fabricated battery. Using an agate mortar, 10% by mass of sulfur (S$_8$) as a positive electrode 23, 60% by mass of Ketjenblack as a conductive auxiliary agent, and 30% by mass of polytetrafluoroethylene (PTFE) as a binder were mixed together. The mixture was then rolled and molded about 10 times using a roller compactor while being mixed thoroughly and uniformly with acetone. Thereafter, the rolled and molded product was dried by vacuum drying at 70° C. for 12 hours. The positive electrode 23 was thus obtained. A nickel mesh used as the current collector was attached to the positive electrode and used.

A gasket 22 was placed on a coin battery can 21, and the positive electrode 23 formed of sulfur, a separator 24 formed of glass fiber, a negative electrode 25 formed of Mg foil having a diameter of 15 mm and a thickness of 20 μm, a spacer 26 formed of a stainless steel plate having a thickness of 0.5 mm, and a coin battery lid 27 were laminated in this order, and then the coin battery can 21 was crimped for sealing. The spacer 26 was spot welded to the coin battery lid 27 in advance. The electrolytic solution was used in the form of being contained in the separator 24 of a coin battery 20.

The fabricated battery was charged and discharged. The charge and discharge conditions are as follows.
(Charge and Discharge Conditions)
Discharge condition: CC discharge 0.1 mA/0.4 V cutoff
Charge condition: CC charge 0.1 mA/2.2 V cutoff
Temperature: 25° C.

Figure 13:
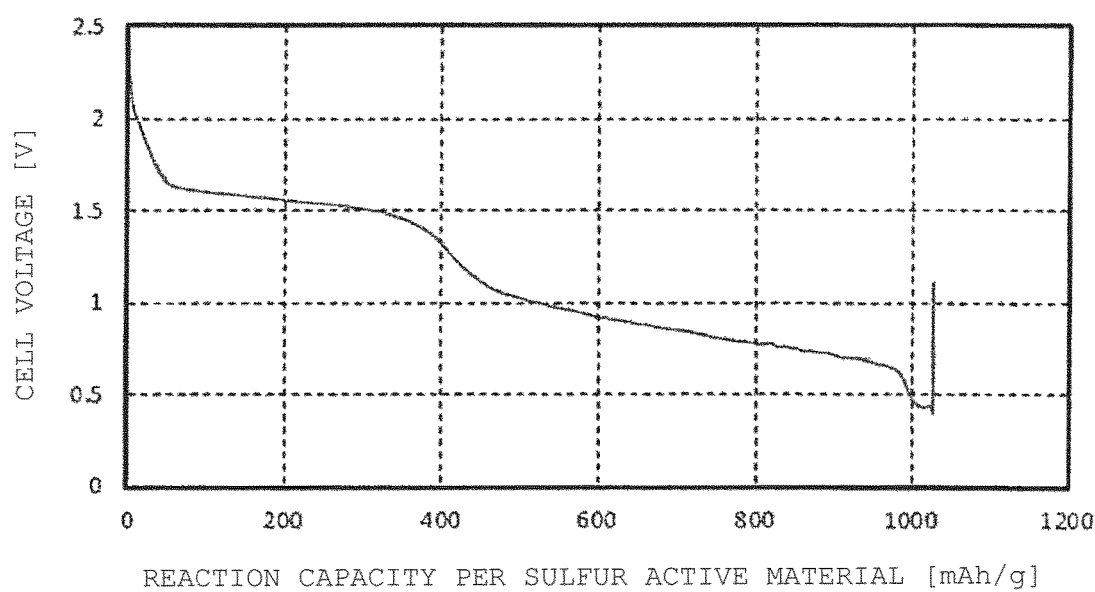
FIG. 13 is a graph (discharge curve) illustrating the results acquired in [Demonstration test of magnesium electrode-based electrochemical device] of the present disclosure.

The results are illustrated in FIG. 13. In the graph of FIG. 13, the vertical axis indicates the cell voltage and the horizontal axis indicates the reaction capacity per unit mass of the sulfur active material. From the graph illustrated in FIG. 13, it has been found that the sulfur reaction capacity is 1000 mAh/g or more and the magnesium-sulfur secondary battery is favorable as a system.

The electrode according to the present disclosure can be utilized in various fields for extracting energy by utilizing an electrochemical reaction. Although it is merely an example, the electrode (magnesium-containing electrode) according to the present disclosure is used not only in secondary batteries but also in various electrochemical devices such as capacitors, air batteries, and fuel cells.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for fabricating a magnesium-containing electrode for an electrochemical device, comprising:
   fabricating the magnesium-containing electrode by a plating method, wherein
   a plating solution used in the plating method includes a solvent containing an ether, and
   the solvent includes a first magnesium salt having a disilazide structure represented by a formula (R3Si)2N, and a second magnesium salt that does not have the disilazide structure,
   wherein R represents a hydrocarbon group having 1 or more and 10 or less carbon atoms, and wherein the second magnesium salt includes at least two kinds of salts.

2. The method for fabricating a magnesium-containing electrode for an electrochemical device according to claim 1, wherein the two kinds of the second magnesium salts include a metal halide salt and a metal imide salt.

3. The method for fabricating a magnesium-containing electrode for an electrochemical device according to claim 1, wherein the R in the disilazide structure represents an aliphatic hydrocarbon group having 1 or more and 10 or less carbon atoms.

4. The method for fabricating a magnesium-containing electrode for an electrochemical device according to claim 1, wherein the R in the disilazide structure represents a lower alkyl group having 1 or more and 4 or less carbon atoms.

5. The method for fabricating a magnesium-containing electrode for an electrochemical device according to claim 1, wherein the first magnesium salt includes magnesium bis(hexamethyldisilazide).

6. The method for fabricating a magnesium-containing electrode for an electrochemical device according to claim 2, wherein the metal halide salt includes magnesium chloride.

7. The method for fabricating a magnesium electrode-containing for an electrochemical device according to claim 2, wherein the metal imide salt includes a magnesium salt of perfluoroalkylsulfonylimide.

8. The method for fabricating a magnesium-containing electrode for an electrochemical device according to claim 1, wherein the two kinds of the second magnesium salts include magnesium chloride and magnesium bis(trifluoromethanesulfonyl)imide.

9. The method for fabricating a magnesium-containing electrode for an electrochemical device according to claim 1, wherein the ether includes a linear ether.

10. The method for fabricating a magnesium-containing electrode for an electrochemical device according to claim 9, wherein the linear ether is represented by following formula:

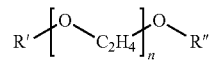

wherein R' and R'' each independently represent a hydrocarbon group having 1 or more and 10 or less carbon atoms, and n is an integer of 1 or more and 10 or less.

11. The method for fabricating a magnesium-containing electrode for an electrochemical device according to claim 10, wherein the R' and the R'' each independently represent a lower alkyl group having 1 or more and 4 or less carbon atoms.

12. The method for fabricating a magnesium-containing electrode for an electrochemical device according to claim 1, wherein magnesium is precipitated on a metal material to form a magnesium foil on the metal material and the magnesium-containing electrode includes the metal material and the magnesium foil.

13. The method for fabricating a magnesium-containing electrode for an electrochemical device according to claim 1, wherein a granular precipitate is obtained as a magnesium precipitate in the plating method.

14. The method for fabricating a magnesium-containing electrode for an electrochemical device according to claim 13, wherein the granular precipitate has a geometric shape.

15. The method for fabricating a magnesium-containing electrode for an electrochemical device according to claim 1, wherein the plating method is electroless plating.

16. The method for fabricating a magnesium-containing electrode for an electrochemical device according to claim 1, wherein the electrochemical device is a magnesium secondary battery.

* * * * *